US009116283B2

(12) United States Patent
Konishi et al.

(10) Patent No.: US 9,116,283 B2
(45) Date of Patent: Aug. 25, 2015

(54) LENS BARREL

(71) Applicant: Panasonic Corporation, Osaka (JP)

(72) Inventors: Akio Konishi, Hyogo (JP); Fumio Shinano, Osaka (JP); Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/447,907

(22) Filed: Jul. 31, 2014

(65) Prior Publication Data

US 2014/0340773 A1 Nov. 20, 2014

Related U.S. Application Data

(63) Continuation of application No. PCT/JP2013/000595, filed on Feb. 1, 2013.

(30) Foreign Application Priority Data

Feb. 2, 2012 (JP) ................................ 2012-021389
Feb. 2, 2012 (JP) ................................ 2012-021391
Feb. 2, 2012 (JP) ................................ 2012-021392
Feb. 2, 2012 (JP) ................................ 2012-021393

(51) Int. Cl.
*G02B 7/02* (2006.01)
*G02B 15/14* (2006.01)
(Continued)

(52) U.S. Cl.
CPC ........ *G02B 7/04* (2013.01); *G02B 7/023* (2013.01); *G02B 7/102* (2013.01); *G02B 7/12* (2013.01);
(Continued)

(58) Field of Classification Search
CPC .......... G02B 7/04; G02B 7/021; G02B 7/022; G02B 7/023; G02B 7/026; G02B 7/102; G02B 7/12; G03B 5/00; G03B 5/06; G03B 11/043; G03B 11/045; G03B 11/04; G03B 13/34; G03B 17/00; G03B 17/04; G03B 17/565; G03B 2205/0046; G03B 2205/0092
USPC ......... 359/813, 822, 823, 826, 827, 554, 557, 359/694–704; 396/55, 72–75, 83–85, 344, 396/348–350, 459
See application file for complete search history.

(56) References Cited

U.S. PATENT DOCUMENTS

| 5,486,889 A | 1/1996 | Shintani |
| 6,018,426 A | 1/2000 | Funahashi |

(Continued)

FOREIGN PATENT DOCUMENTS

| JP | 63-138320 A | 6/1986 |
| JP | 63-138320 A | 6/1988 |

(Continued)

OTHER PUBLICATIONS

International Search Report for corresponding International Application No. PCT/JP2013/000595 mailed May 7, 2013.

(Continued)

*Primary Examiner* — Loha Ben
(74) *Attorney, Agent, or Firm* — Renner, Otto, Boisselle & Sklar, LLP

(57) ABSTRACT

The lens barrel includes a support frame and a retracting lens frame. The retracting lens frame is configured to support a lens and move around a retraction shaft with respect to the support frame during a transition period between an imaging enabled state and a housed state. The retraction shaft is substantially parallel to the optical axis. The retracting lens frame includes at least three contact portions. The at least three contact portions is configured to come into contact with the support frame at positions that are different from the retraction shaft. Movement of the retracting lens frame in the optical axis direction is restricted when the contact portions come into contact with the support frame. At least one of the contact portions is provided to the retracting lens frame so as to overlap the lens in a direction perpendicular to the optical axis.

15 Claims, 24 Drawing Sheets

(51) Int. Cl.

| | | |
|---|---|---|
| *G03B 17/00* | (2006.01) | |
| *G03B 17/04* | (2006.01) | |
| *G02B 7/04* | (2006.01) | |
| *G02B 7/12* | (2006.01) | |
| *G03B 13/34* | (2006.01) | |
| *G03B 17/56* | (2006.01) | |
| *G03B 5/00* | (2006.01) | |
| *G02B 7/10* | (2006.01) | |
| *G02B 15/15* | (2006.01) | |

(52) U.S. Cl.
CPC  *G02B 15/15* (2013.01); *G03B 5/00* (2013.01); *G03B 13/34* (2013.01); *G03B 17/04* (2013.01); *G03B 17/565* (2013.01); *G03B 2205/0092* (2013.01)

(56) References Cited

U.S. PATENT DOCUMENTS

| | | | |
|---|---|---|---|
| 7,088,523 B2 | 8/2006 | Hamasaki et al. | |
| 7,102,831 B2 | 9/2006 | Omiya et al. | |
| 7,194,203 B2 | 3/2007 | Omiya et al. | |
| 7,265,913 B2 | 9/2007 | Nagai et al. | |
| 7,338,219 B2 | 3/2008 | Ishizuka et al. | |
| 7,455,465 B2 * | 11/2008 | Nuno et al. | 396/349 |
| 7,477,308 B2 | 1/2009 | Omiya et al. | |
| 7,492,536 B2 | 2/2009 | Nagai et al. | |
| 7,507,040 B2 | 3/2009 | Nomura et al. | |
| 7,515,182 B2 | 4/2009 | Omiya et al. | |
| 7,515,195 B2 | 4/2009 | Endo et al. | |
| 7,527,438 B2 | 5/2009 | Nomura et al. | |
| 7,689,110 B2 | 3/2010 | Yumiki et al. | |
| 7,746,584 B2 | 6/2010 | Honsho et al. | |
| 7,753,598 B2 | 7/2010 | Ishizuke et al. | |
| 7,755,855 B2 * | 7/2010 | Shimazaki et al. | 359/774 |
| 7,777,976 B2 | 8/2010 | Nomura et al. | |
| 7,780,362 B2 | 8/2010 | Nomura et al. | |
| 7,860,383 B2 | 12/2010 | Nomura et al. | |
| 7,864,241 B2 * | 1/2011 | Iwasaki | 348/360 |
| 7,920,345 B2 | 4/2011 | Honsho et al. | |
| 8,041,204 B2 | 10/2011 | Nomura | |
| 8,218,255 B2 | 7/2012 | Katano | |
| 8,228,619 B2 | 7/2012 | Koyama | |
| 8,351,775 B2 | 1/2013 | Nagae | |
| 8,396,358 B2 | 3/2013 | Suzuka | |
| 8,432,477 B2 | 4/2013 | Honsho et al. | |
| 8,441,742 B2 | 5/2013 | Koyama | |
| 8,451,544 B2 * | 5/2013 | Suzuki | 359/704 |
| 8,498,528 B2 | 7/2013 | Suzuka | |
| 8,665,535 B2 | 3/2014 | Shinano et al. | |
| 8,730,600 B2 | 5/2014 | Iwasaki et al. | |
| 8,773,762 B2 | 7/2014 | Suzuka | |
| 8,776,615 B2 * | 7/2014 | Kempainen et al. | 73/862.044 |
| 2005/0207748 A1 | 9/2005 | Ishizuka et al. | |
| 2006/0034001 A1 | 2/2006 | Nagai et al. | |
| 2006/0034604 A1 | 2/2006 | Nomura et al. | |
| 2006/0092526 A1 | 5/2006 | Hamasaki et al. | |
| 2007/0253689 A1 | 11/2007 | Nagai et al. | |
| 2008/0180812 A1 | 7/2008 | Honsho et al. | |
| 2009/0207509 A1 | 8/2009 | Nomura et al. | |
| 2009/0231709 A1 | 9/2009 | Nomura et al. | |
| 2010/0067896 A1 | 3/2010 | Murakami | |
| 2010/0142939 A1 | 6/2010 | Honsho et al. | |
| 2011/0001872 A1 | 1/2011 | Honsho et al. | |
| 2011/0013897 A1 | 1/2011 | Nagae | |
| 2011/0019290 A1 | 1/2011 | Shinano et al. | |
| 2011/0026143 A1 | 2/2011 | Katano | |
| 2011/0032627 A1 | 2/2011 | Koyama | |
| 2012/0257286 A1 | 10/2012 | Koyama | |
| 2013/0215316 A1 | 8/2013 | Honsho et al. | |
| 2014/0340751 A1 | 11/2014 | Konishi et al. | |
| 2014/0340754 A1 | 11/2014 | Uno et al. | |

FOREIGN PATENT DOCUMENTS

| | | |
|---|---|---|
| JP | 05-090416 | 12/1993 |
| JP | 06-034865 A | 2/1994 |
| JP | 06-051178 | 2/1994 |
| JP | 08-152659 A | 6/1996 |
| JP | 10-003103 | 1/1998 |
| JP | 11-160606 A | 6/1999 |
| JP | 2000-292848 | 10/2000 |
| JP | 2001-042189 | 2/2001 |
| JP | 2001-235670 | 8/2001 |
| JP | 2003-315861 A | 11/2003 |
| JP | 2004-233916 A | 8/2004 |
| JP | 2005-172953 A | 6/2005 |
| JP | 2005-227597 A | 8/2005 |
| JP | 2005-266345 A | 9/2005 |
| JP | 2006-053444 | 2/2006 |
| JP | 2006-053445 A | 2/2006 |
| JP | 2006-058455 A | 3/2006 |
| JP | 2006-126537 A | 5/2006 |
| JP | 2006-330657 A | 12/2006 |
| JP | 2007-163961 A | 6/2007 |
| JP | 2007-178751 | 7/2007 |
| JP | 2007-199320 | 8/2007 |
| JP | 2007-206210 A | 8/2007 |
| JP | 2008-015387 A | 1/2008 |
| JP | 2008-046504 A | 2/2008 |
| JP | 2008-139802 | 6/2008 |
| JP | 2008-158288 A | 7/2008 |
| JP | 2008-185786 A | 8/2008 |
| JP | 2009-157245 A | 7/2009 |
| JP | 2009-216881 A | 9/2009 |
| JP | 2009-217243 A | 9/2009 |
| JP | 2009-244874 A | 10/2009 |
| JP | 2009-251063 | 10/2009 |
| JP | 2009-251064 A | 10/2009 |
| JP | 2010-026163 A | 2/2010 |
| JP | 2010-164695 A | 7/2010 |
| JP | 2010-217511 A | 9/2010 |
| JP | 2011-013613 B | 1/2011 |
| JP | 2011-022234 A | 2/2011 |
| JP | 2011-033667 A | 2/2011 |
| JP | 2011-039090 A | 2/2011 |
| JP | 2011-039527 A | 2/2011 |
| JP | 2011-048346 A | 3/2011 |
| JP | 2011-150132 A | 8/2011 |
| JP | 2011-154204 | 8/2011 |
| JP | 2011-158592 A | 8/2011 |
| JP | 2011-170262 A | 9/2011 |
| JP | 2011-209348 A | 10/2011 |
| JP | 2011-209652 A | 10/2011 |
| JP | 2011-215389 | 10/2011 |
| JP | 2012-018325 A | 1/2012 |

OTHER PUBLICATIONS

International Search Report for related International Application No. PCT/JP2013/000592 mailed Mar. 5, 2013.

International Search Report for related International Application No. PCT/JP2013/000586 mailed May 7, 2013.

International Search Report for related International Application No. PCT/JP2013/000588 mailed May 7, 2013.

International Search Report for related International Application No. PCT/JP2013/000589 mailed May 7, 2013.

International Search Report for related International Application No. PCT/JP2012/008448 mailed Feb. 12, 2013.

International Search Report for related International Application No. PCT/JP2013/000594 mailed Mar. 12, 2013.

Co-pending U.S. Appl. No. 14/447,744, filed on Jul. 31, 2014.

Co-pending U.S. Appl. No. 14/447,791, filed on Jul. 31, 2014.

Co-pending U.S. Appl. No. 14/447,871, filed on Jul. 31, 2014.

Co-pending U.S. Appl. No. 14/447,843, filed on Jul. 31, 2014.

Co-pending U.S. Appl. No. 14/448,069, filed on Jul. 31, 2014.

(56) References Cited

OTHER PUBLICATIONS

Co-pending U.S. Appl. No. 14/448,112, filed on Jul. 31, 2014.
Office Action issued on Mar. 12, 2015 for Co-Pending U.S. Appl. No. 14/448,112.
Notice of Allowance issued on Jan. 21, 2015 for U.S. Appl. No. 14/447,843.
Notice of Allowance issued on Jan. 26, 2015 for U.S. Appl. No. 14/447,791.

* cited by examiner

LENS BARREL

CROSS-REFERENCE TO RELATED APPLICATIONS

This is a continuation application of International Application PCT/JP2013/000595, with an international filing date of Feb. 1, 2013 which claims priority to Japanese Patent Application No. 2012-021392 filed on Feb. 2, 2012, Japanese Patent Application No. 2012-021393 filed on Feb. 2, 2012, Japanese Patent Application No. 2012-021389 filed on Feb. 2, 2012, and Japanese Patent Application No. 2012-021391 filed on Feb. 2, 2012. The entire disclosures of International Application PCT/JP2013/000595, Japanese Patent Application No. 2012-021392, Japanese Patent Application No. 2012-021393, Japanese Patent Application No. 2012-021389, and Japanese Patent Application No. 2012-021391 are hereby incorporated herein by reference.

BACKGROUND

1. Technical Field

The technology disclosed herein relates to a lens barrel equipped with an optical system.

2. Background Information

A lens barrel having three protrusions for positioning a subordinate optical system with respect to a main optical system has been disclosed in the past (see Japanese Laid-Open Patent Application S63-138320).

In prior art, the protrusions and the subordinate optical system are disposed at positions that are separated in the optical axis direction, so there is the risk that a unit constituted by a subordinate optical system holder and a member for supporting the subordinate optical system holder ends up being too large in the optical axis direction.

The technology disclosed herein was conceived in light of the above problem, and it is an object of the present technology to reduce the size (thickness) of a lens barrel in the optical axis direction.

SUMMARY

The lens barrel disclosed herein comprises a support frame and a retracting lens frame. The retracting lens frame is configured to support a lens and move around a retraction shaft with respect to the support frame during a transition period between an imaging enabled state and a housed state. The retraction shaft is substantially parallel to the optical axis. The retracting lens frame includes at least three contact portions. The at least three contact portions is configured to come into contact with the support frame at positions that are different from the retraction shaft. Movement of the retracting lens frame in the optical axis direction is restricted when the contact portions come into contact with the support frame. At least one of the contact portions is provided to the retracting lens frame so as to overlap the lens in a direction perpendicular to the optical axis.

The technology disclosed herein provides a lens barrel that can be made more compact.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Next, an embodiment of the present technology will now be described through reference to the drawings. In the description of the drawings that follows, portions that are the same or similar will be numbered the same or similarly. The drawings are merely schematic representations, however, and the proportions of the various dimensions and so forth may be different from those in actuality. Therefore, the specific dimensions and so forth should be determined by referring to the following description. Also, the mutual dimensional relations and proportions among the drawings may, of course, vary in some portions.

In the following embodiment, a digital camera will be described as an example of an imaging device. In the following description, assuming that the digital camera is in its landscape orientation, the subject side will be referred to as the "front," the opposite side from the subject as the "rear," the vertically upper side as "upper," the vertically lower side as "lower," the right side when facing the subject as "right," and the left side when facing the subject as "left." "Landscape orientation" is a kind of orientation of a digital camera, and when an image is captured in landscape orientation, the long-side direction of a rectangular image that is wider than it is tall substantially coincides with the horizontal direction within the image.

1. Overall Configuration of Digital Camera

Figure 1:
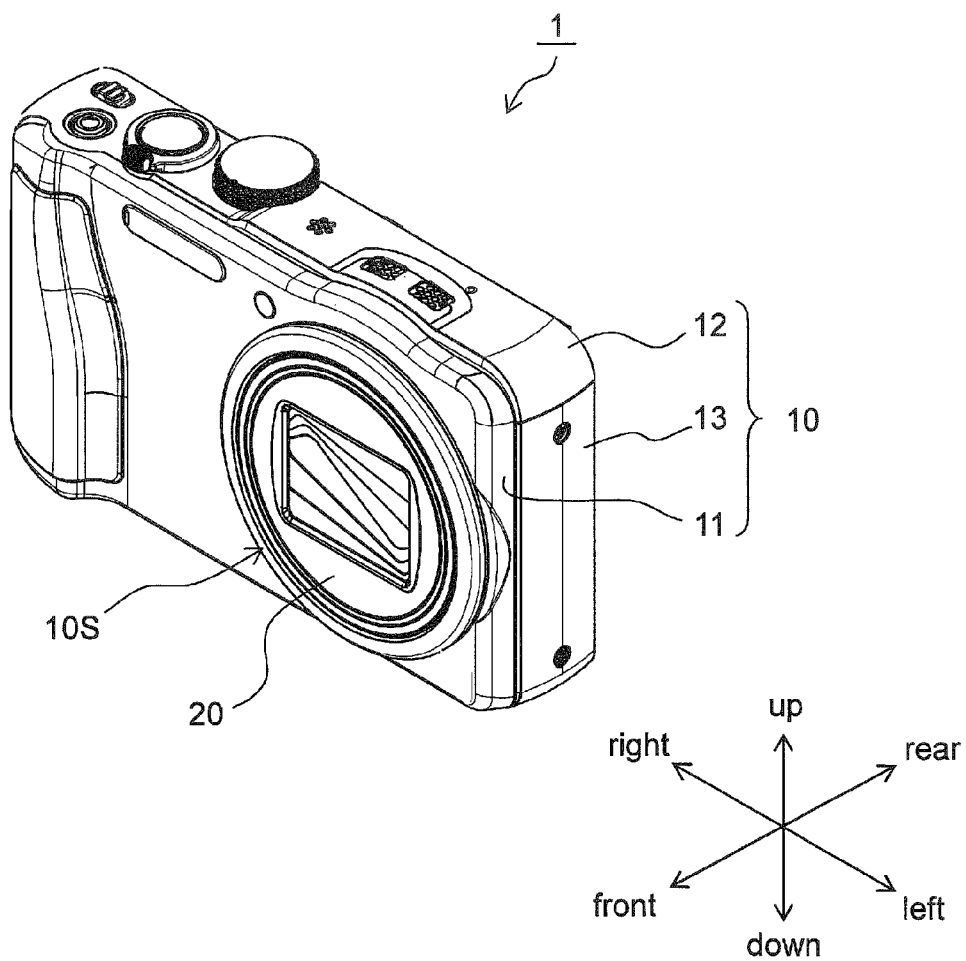
FIG. 1 is an oblique view of a digital camera.
Figure 2:
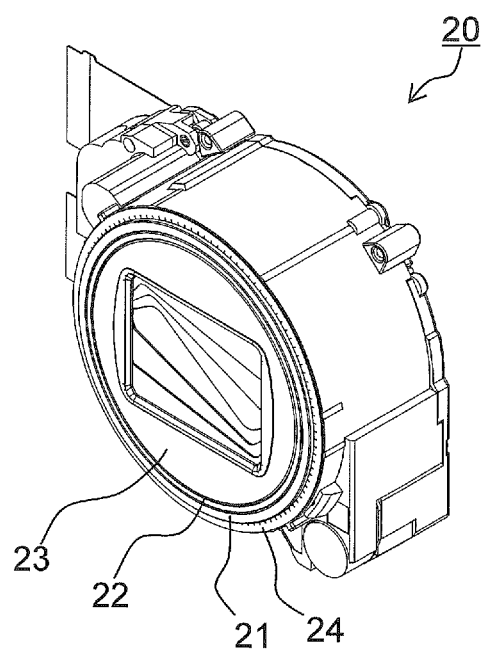
FIG. 2 is an oblique view of a lens barrel in its retracted state.
Figure 3:
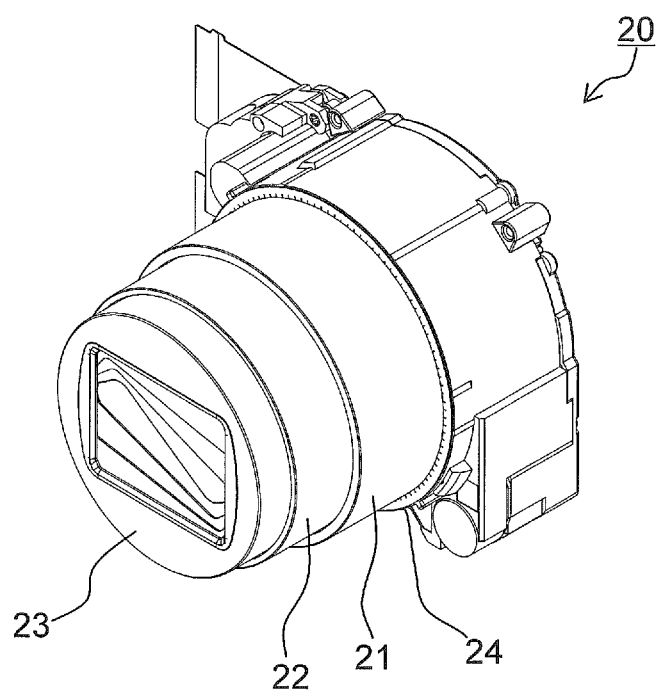
FIG. 3 is an oblique view of the lens barrel in its wide angle state.

The configuration of a digital camera 1 will be described through reference to the drawings. FIG. 1 is an oblique view of the digital camera 1. FIGS. 2 and 3 are oblique views of a lens barrel 20. In FIG. 2, the lens barrel 20 is shown in its retracted state, and in FIG. 3, the lens barrel 20 is shown in its wide angle state.

As shown in FIG. 1, the digital camera 1 comprises a housing 10 and the lens barrel 20.

The housing 10 is made up of a front panel 11, a rear panel 12, and a side panel 13. An opening 10S is formed in the front panel 11.

The lens barrel 20 comprises a three-stage telescoping zoom mechanism. The lens barrel 20 is housed in the housing 10 when not being used for imaging, and is deployed forward from the opening 10S when used for imaging. More specifically, as shown in FIGS. 2 and 3, the lens barrel 20 has a first movable lens barrel part 21, a second movable lens barrel part 22, a third movable lens barrel part 23, and a stationary lens barrel part 24.

The first movable lens barrel part 21 is configured to deploy with respect to the stationary lens barrel part 24. The second movable lens barrel part 22 is configured to deploy with respect to the first movable lens barrel part 21. The third movable lens barrel part 23 is configured to deploy with respect to the second movable lens barrel part 22. The stationary lens barrel part 24 is fixed inside the housing 10. As shown in FIG. 3, when the lens barrel 20 is deployed, the third movable lens barrel part 23 is positioned the farthest forward out of the first to third movable lens barrel parts 21 to 23.

2. Configuration of Lens Barrel

Figure 4:
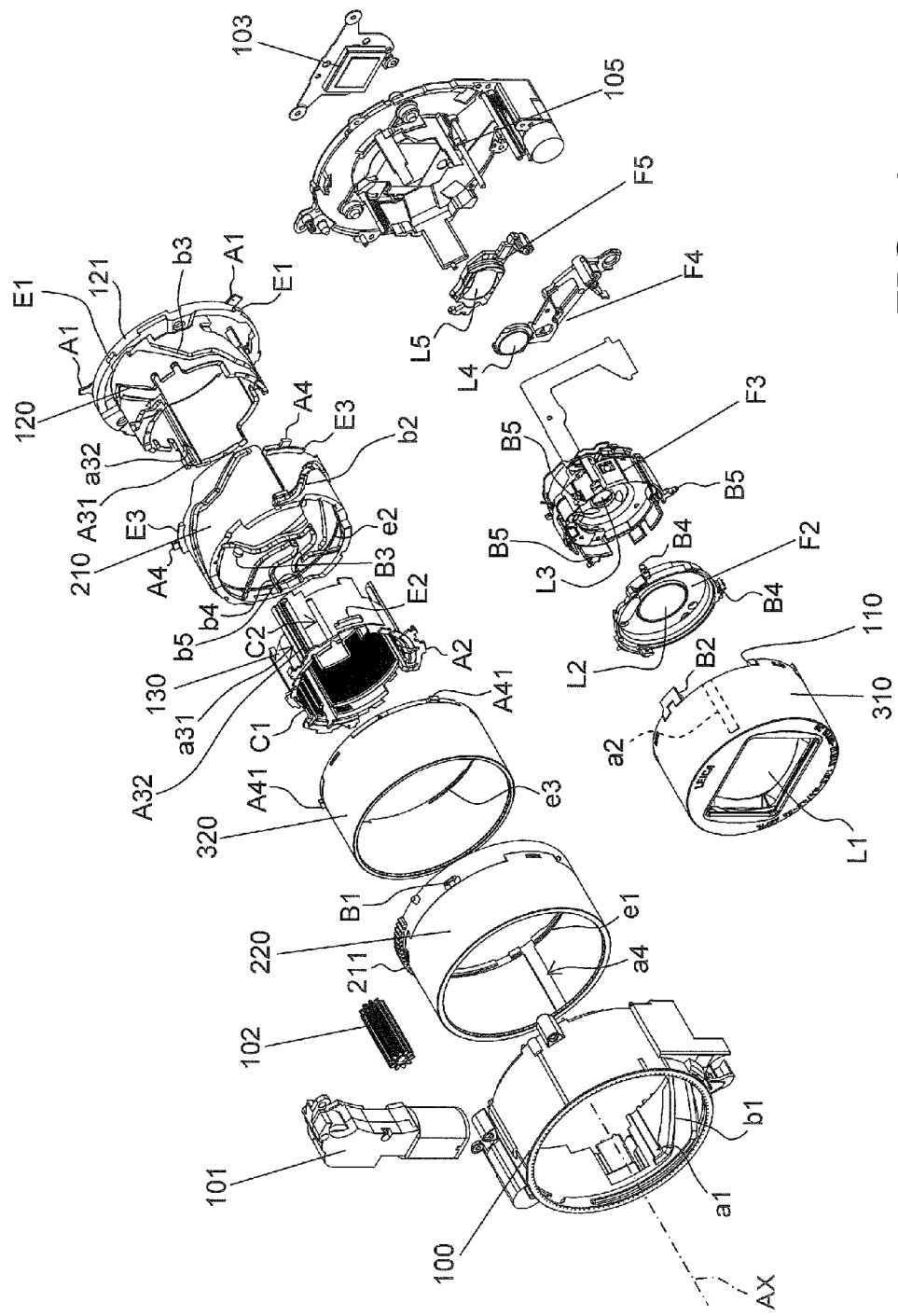
FIG. 4 is an exploded oblique view of the lens barrel.

Next, the configuration of the lens barrel 20 will be described through reference to the drawings. FIG. 4 is an exploded oblique view of the lens barrel 20.

The first to third movable lens barrel parts 21 to 23 of the lens barrel 20 are deployed from the stationary lens barrel part 24 along the optical axis AX of the optical system. The optical system includes first to fifth lens groups L1 to L5. In the following description, a direction parallel to the optical axis AX will be called the "optical axis direction," a direction perpendicular to the optical axis direction will be called the "radial direction," and a direction that follows a circle whose center is the optical axis AX will be called the "peripheral direction." The optical axis AX substantially coincides with the axis of the various frames that make up the lens barrel 20.

As shown in FIG. 4, the lens barrel 20 comprises a stationary frame 100, a master flange 105, a first rectilinear frame 110, a second rectilinear frame 120, a third rectilinear frame 130, a first rotary frame 210, a second rotary frame 220, a first cosmetic frame 310, a second cosmetic frame 320, a second lens group frame F2, a third lens group frame F3, a fourth lens group frame F4, and a fifth lens group frame F5.

In this embodiment, the stationary frame 100 and the master flange 105 constitute the stationary lens barrel part 24. The first rectilinear frame 110 constitutes the third movable lens barrel part 23. The third rectilinear frame 130, the first rotary frame 210, and the second cosmetic frame 320 constitute the second movable lens barrel part 22. The second rectilinear frame 120 and the second rotary frame 220 constitute the first movable lens barrel part 21.

The stationary frame 100 is in the form of a cylinder. The stationary frame 100 has a rectilinear groove a1 and a cam groove b1 formed in its inner peripheral face. A zoom motor 101 and a zoom gear 102 are attached to the outer peripheral face of the stationary frame 100. The zoom motor 101 is a drive source for deploying the first to third movable lens barrel parts 21 to 23. The zoom gear 102 transmits the drive force of the zoom motor 101 to the second rotary frame 220.

The master flange 105 is a flat plastic member that covers the rear of the stationary frame 100. An imaging element 103 is fitted in the center of a master flange 244.

The first rectilinear frame 110 is in the form of a cylinder, and is disposed on the outside of the first rotary frame 210. The first rectilinear frame 110 has a rectilinear groove a2 and a cam protrusion B2. The rectilinear groove a2 is formed along the optical axis direction on the inner peripheral face. The cam protrusion B2 is disposed at the rear end of the inner peripheral face. The cam protrusion B2 is engaged with a cam groove b2 of the first rotary frame 210 (discussed below). The first rectilinear frame 110 supports the first lens group L1 for bringing light into the lens barrel 20. The first rectilinear frame 110 is covered by the first cosmetic frame 310.

The second rectilinear frame 120 is in the form of a cylinder, and is disposed on the inside of the first rectilinear frame 110. The second rectilinear frame 120 has a flange 121, a rectilinear protrusion A1, a bayonet protrusion E1, a rectilinear protrusion A31, a rectilinear groove a32, and a cam groove b3. The flange 121 is formed in an annular shape, and is provided to the rear end part of the outer peripheral face. The rectilinear protrusion A1 is provided to the outer peripheral face of the flange 121. The rectilinear protrusion A1 is engaged with the rectilinear groove a1 of the stationary frame 100. The bayonet protrusion E1 is provided to the outer peripheral face of the flange 121. The bayonet protrusion E1 is engaged with a bayonet groove e1 of the second rotary frame 220 (discussed below). The rectilinear protrusion A31 is formed on the outer peripheral face along the optical axis direction. The rectilinear protrusion A31 is engaged with the rectilinear groove a32 of the third rectilinear frame 130 (discussed below). The rectilinear groove a32 is formed in the outer peripheral face along the rectilinear protrusion A31. A rectilinear protrusion A32 of the third rectilinear frame 130 (discussed below) is engaged with the rectilinear groove a32. The cam groove b3 is formed in the outer peripheral face so as to intersect with the optical axis direction.

The third rectilinear frame 130 is in the form of a cylinder, and is disposed on the inside of the second rectilinear frame 120. The third rectilinear frame 130 has a rectilinear protrusion A2, the rectilinear protrusion A32, a rectilinear groove a31, a bayonet protrusion E2, a through-groove c1, and a through-groove c2. The rectilinear protrusion A2 is provided to the front end part of the outer peripheral face. The rectilinear protrusion A2 is engaged with the rectilinear groove a2 of the first rectilinear frame 110. The rectilinear protrusion A32 is formed in the outer peripheral face along the optical axis direction. The rectilinear protrusion A32 is engaged with the rectilinear groove a32 of the second rectilinear frame 120.

The rectilinear groove a31 is formed in the outer peripheral face along the rectilinear protrusion A32. The rectilinear protrusion A31 of the second rectilinear frame 120 is engaged with the rectilinear groove a31. The bayonet protrusion E2 is formed on the outer peripheral face along the peripheral direction. The bayonet protrusion E2 is engaged with a bayonet groove e2 of the first rotary frame 210 (discussed below). The through-groove c1 and the through-groove c2 pass through the frame main body from the inner peripheral face to the outer peripheral face, and are formed along the optical axis direction.

The first rotary frame 210 is in the form of a cylinder, and is disposed on the inside of the first rectilinear frame 110. The first rotary frame 210 has a bayonet protrusion E3, a rectilinear protrusion A4, a cam protrusion B3, the cam groove b2, a cam groove b4, and a cam groove b5. The bayonet protrusion E3 is formed at the rear end part of the outer peripheral face, along the peripheral direction. The bayonet protrusion E3 is engaged with a bayonet groove e3 of the second cosmetic frame 320 (discussed below). The rectilinear protrusion A4 is provided to the outer peripheral face of the bayonet protrusion E3. The rectilinear protrusion A4 is engaged with a rectilinear groove a4 of the second rotary frame 220 (discussed below). The cam protrusion B3 is disposed on the inner peripheral face. The cam protrusion B3 is engaged with the cam groove b3 of the second rectilinear frame 120. The cam groove b2 is formed in the outer peripheral face so as to intersect with the optical axis direction. The cam groove b4 and the cam groove b5 are formed in the inner peripheral face so as to intersect with the optical axis direction.

The second rotary frame 220 is in the form of a cylinder, and is disposed on the inside of the stationary frame 100. The second rotary frame 220 has a gear part 221, a cam protrusion B1, the rectilinear groove a4, and the bayonet groove e1. The gear part 221 is formed at the rear end part of the outer peripheral face, along the peripheral direction. When the gear part 221 meshes with a zoom gear 242, the second rotary frame 220 is rotated in the peripheral direction by the drive force of the zoom motor 101. The cam protrusion B1 is engaged with the cam groove b1 of the stationary frame 100. The rectilinear groove a4 is formed in the inner peripheral face along the optical axis direction. The rectilinear protrusion A4 of the first rotary frame 210 is engaged with the rectilinear groove a4. The bayonet groove e1 is formed at the rear end part of the inner peripheral face, along the peripheral direction. The bayonet protrusion E1 of the first rectilinear frame 110 is engaged with the bayonet groove e1.

The first cosmetic frame 310 covers the front face and the outer periphery of the first rectilinear frame 110. An opening is formed in the first cosmetic frame 310 for bringing light in from the outside. The first lens group L1 is disposed inside the opening in the first rectilinear frame 110.

The second cosmetic frame 320 is in the form of a cylinder, and is disposed on the outside of the first rotary frame 210. The second cosmetic frame 320 has a rectilinear protrusion A41 and the bayonet groove e3. The rectilinear protrusion A4 is provided to the rear end part of the outer peripheral face. The rectilinear protrusion A41 is engaged with the rectilinear groove a4 of the second rotary frame 220. The bayonet groove e3 is formed at the rear end part of the inner peripheral face, along the peripheral direction. The bayonet protrusion E3 of the first rotary frame 210 is engaged with the bayonet groove e3.

The second lens group frame F2 is in the form of a disk, and is disposed on the inside of the third rectilinear frame 130. The second lens group frame F2 supports a second lens group L2 used for zooming. The second lens group frame F2 has a cam protrusion B4 that is provided on the outer peripheral face. The cam protrusion B4 is inserted into the through-groove c1 of the third rectilinear frame 130, and is engaged with the cam groove b4 of the first rotary frame 210.

The third lens group frame F3 has a shutter unit and an OIS (optical image stabilizer) unit. The shutter unit supports the OIS unit. The shutter frame is in the form of a cylinder, and is disposed on the inside of the third rectilinear frame 130. The third lens group frame F3 has a built-in shutter mechanism. The third lens group frame F3 has a cam protrusion B5 that is provided on the outer peripheral face. The cam protrusion B5 is inserted into the through-groove c2 of the third rectilinear frame 130, and is engaged with the cam groove b5 of the first rotary frame 210.

The OIS (optical image stabilizer) unit mainly has an OIS frame 400 and a retracting lens frame 401.

The OIS frame 400 is mounted to a shutter frame 335. The OIS frame 400 is movable within a plane that is perpendicular to the optical axis. For example, the OIS frame 400 is moved by an actuator within a plane that is perpendicular to the optical axis.

The retracting lens frame 401 is supported by the OIS frame 400 so as to be movable around a retraction shaft that is substantially parallel to the optical axis. The retracting lens frame 401 supports a third lens group L3 that is used for image blur correction. The third lens group L3 is made up of at least one lens. The position of the retracting lens frame 401 is changed from a correction enabled position (first orientation) in which the third lens group L3 executes image blur correction, to a retracted position (second orientation) in which the third lens group L3 is retracted from the optical axis.

The fourth lens group frame F4 is supported by the stationary frame 100. The fourth lens group frame F4 supports a fourth lens group L4 that is used for focusing.

The fifth lens group frame F5 is supported by the master flange 105. The fifth lens group frame F5 supports a fifth lens group L5.

3. Detailed Configuration of Members Constituting the Lens Barrel

A summary of the various members was given in "2. Configuration of Lens Barrel," but here the configuration of the master flange 105 and the configuration of the third lens group frame F3 will be described in further detail.

3-1. Master Flange

Figure 5:
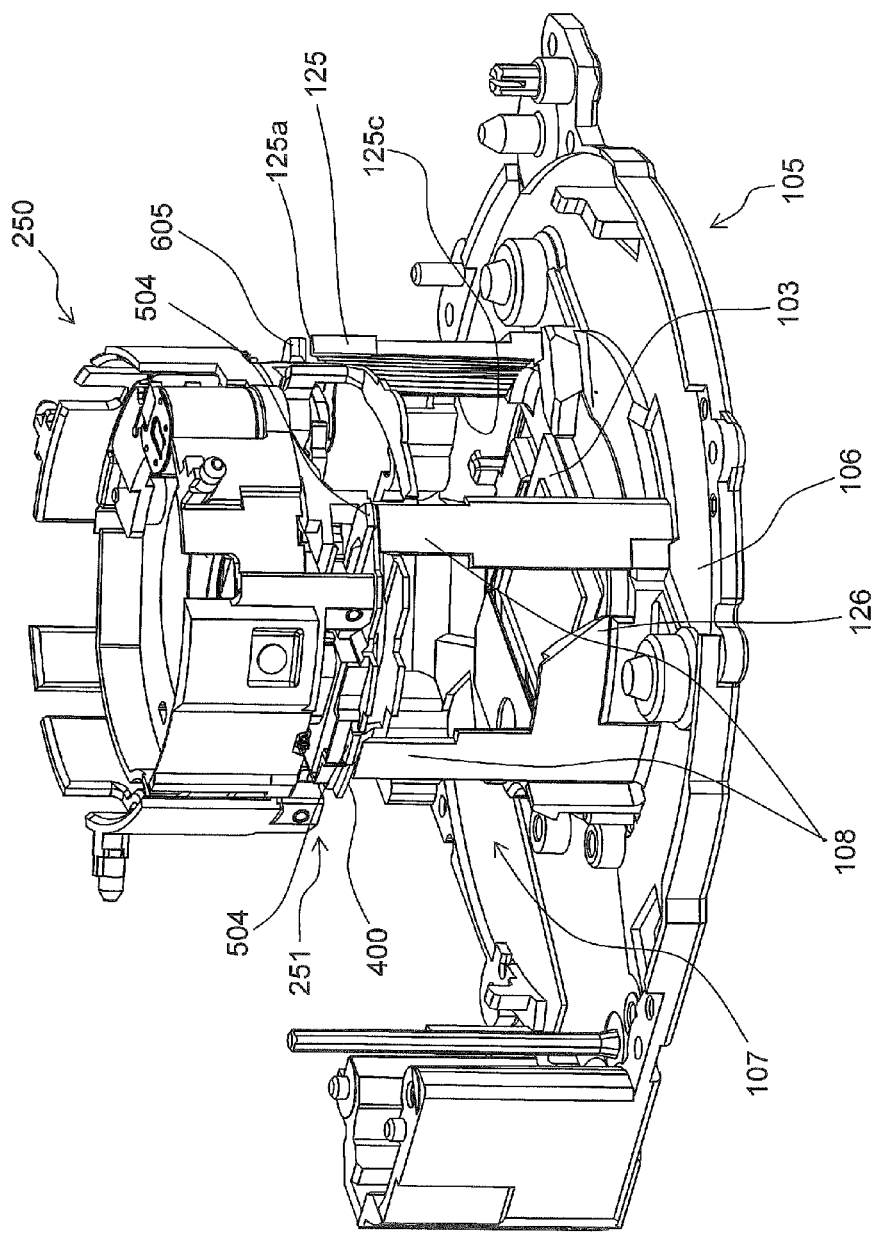
FIG. 5 is an oblique view of a master flange and a shutter unit.

As shown in FIG. 5, the master flange 105 has a master flange main body portion 106 (an example of a first main body portion), a master flange restrictor 107 (first restrictor), a first retracting cam 125, and a second retracting cam 126. The first main body portion 106 is in the form of a disk. The above-mentioned imaging element 103 is mounted in the center of the first main body portion 106.

The first restrictor 107 restricts the movement of the OIS frame 400. More precisely, the first restrictor 107 engages with the OIS unit 251 and restricts the movement of the OIS frame 400. More specifically, the first restrictor 107 engages with the OIS unit 251 and restricts the movement of the OIS frame 400 when the lens barrel 20 transitions from its imaging enabled state to its retracted state (or, when the lens barrel 20 transitions from the retracted state to the imaging enabled state). The phrase "when the lens barrel 20 transitions from its imaging enabled state to its retracted state" here shall sometimes be used to include the meaning of "when the lens barrel 20 transitions from the retracted state to the imaging enabled state."

Figure 6:
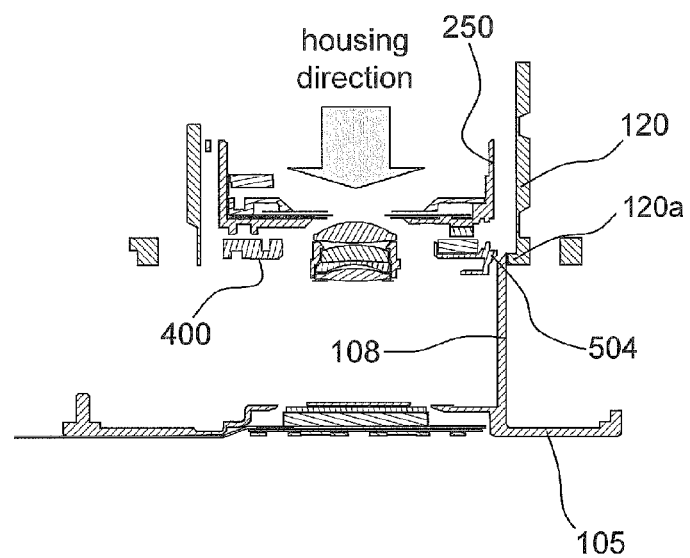
FIG. 6 is a cross section of the master flange and the shutter unit.

As shown in FIGS. 5 and 6, the first restrictor 107 is formed integrally with the first main body portion 106. The first restrictor 107 is constituted by two protrusions 108 that protrude outward from the first main body portion 106. The two protrusions 108 engage with the OIS frame 400 of the OIS unit 251. As shown in FIG. 6, the two protrusions 108 come into contact with the inner peripheral part 120a of the second rectilinear frame 120. This prevents the two protrusions 108 from falling over.

A sloped part is formed on the inner peripheral side of the distal ends of the protrusions 108. These sloped parts guide the OIS frame 400 from a movable orientation in which the OIS frame 400 is movable (the orientation of the imaging enabled state), to a movement restricted orientation in which the movement of the OIS frame 400 is restricted.

The inner peripheral parts on the proximal end side of the protrusions (the portion excluding the above-mentioned distal end (sloped part) and including the middle part) are formed in a planar shape. The inner peripheral parts are the portions that support the OIS frame 400 in its movement restricted orientation. In-plane movement of the OIS frame 400 is reliably restricted by guiding the OIS frame 400 from the sloped parts on the distal end side to the inner peripheral part on the proximal end side. The way in which the in-plane movement of the OIS frame 400 is restricted will be described in detail in the description of the OIS frame 400 (engagement portion).

Figure 7:
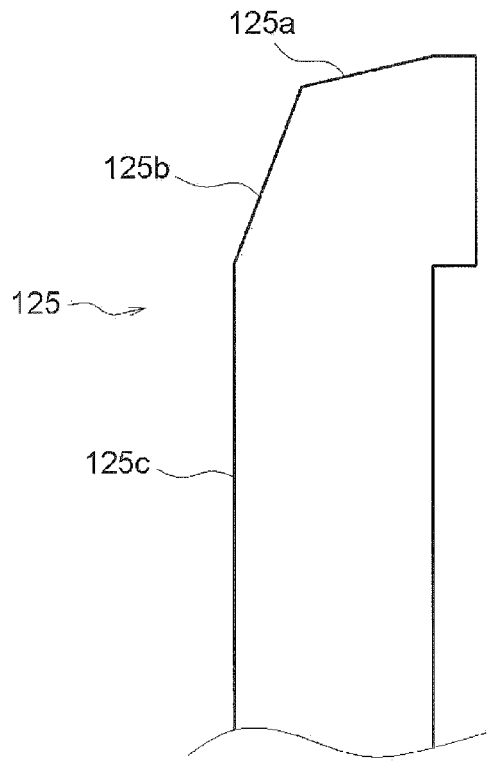
FIG. 7 is a detail side view of a retraction cam of the master flange.

As shown in FIGS. 5 and 7, the first retracting cam 125 is a portion that is longer in one direction and formed integrally with the master flange 105. The first retracting cam 125 has a first guide portion 125a, a second guide portion 125b, and a support portion 125c.

The first guide portion 125a comes into contact with a pressing portion 605 of the retracting lens frame 401, and retracts the retracting lens frame 401. The first guide portion 125a is a portion that is formed inclined to the distal end of the first retracting cam 125.

In a state in which the first guide portion 125a is in contact with the pressing portion 605, the OIS frame 400 is guided by the protrusions 108 from its movable orientation in which the OIS frame 400 is movable (the orientation of the imaging enabled state), to an orientation in which the movement of the OIS frame 400 is restricted (movement restricted orientation).

The second guide portion 125b comes into contact with the pressing portion 605 of the retracting lens frame 401, and further retracts the retracting lens frame 401. The second guide portion 125b is formed continuously with the first guide portion 125a, and is formed at a different angle from that of the first guide portion 125a. In a state in which the second guide portion 125b is in contact with the pressing portion 605 of the retracting lens frame 401, the OIS frame 400 is in its movement restricted orientation.

The support portion 125c is the portion that temporarily supports the retracting lens frame 401 in its retracted position. The retracting lens frame 401 is finally positioned by the second retracting cam 126 (discussed below). The support portion 125c is formed straight in the optical axis direction. In a state in which the support portion 125c has come into contact with the pressing portion 605 of the retracting lens frame 401, the OIS frame 400 is in its movement restricted orientation.

The first retracting cam 125 is the portion that finally positions the retracting lens frame 401. As shown in FIG. 5, the second retracting cam 126 is formed between the two protrusions 108. The first retracting cam 125 has a sloped part. This sloped part guides the retracting lens frame 401 to the retracted position and positions it in the retracted position.

3-2. Third Lens Group Frame
3-2-1. Shutter Unit

Figure 8:
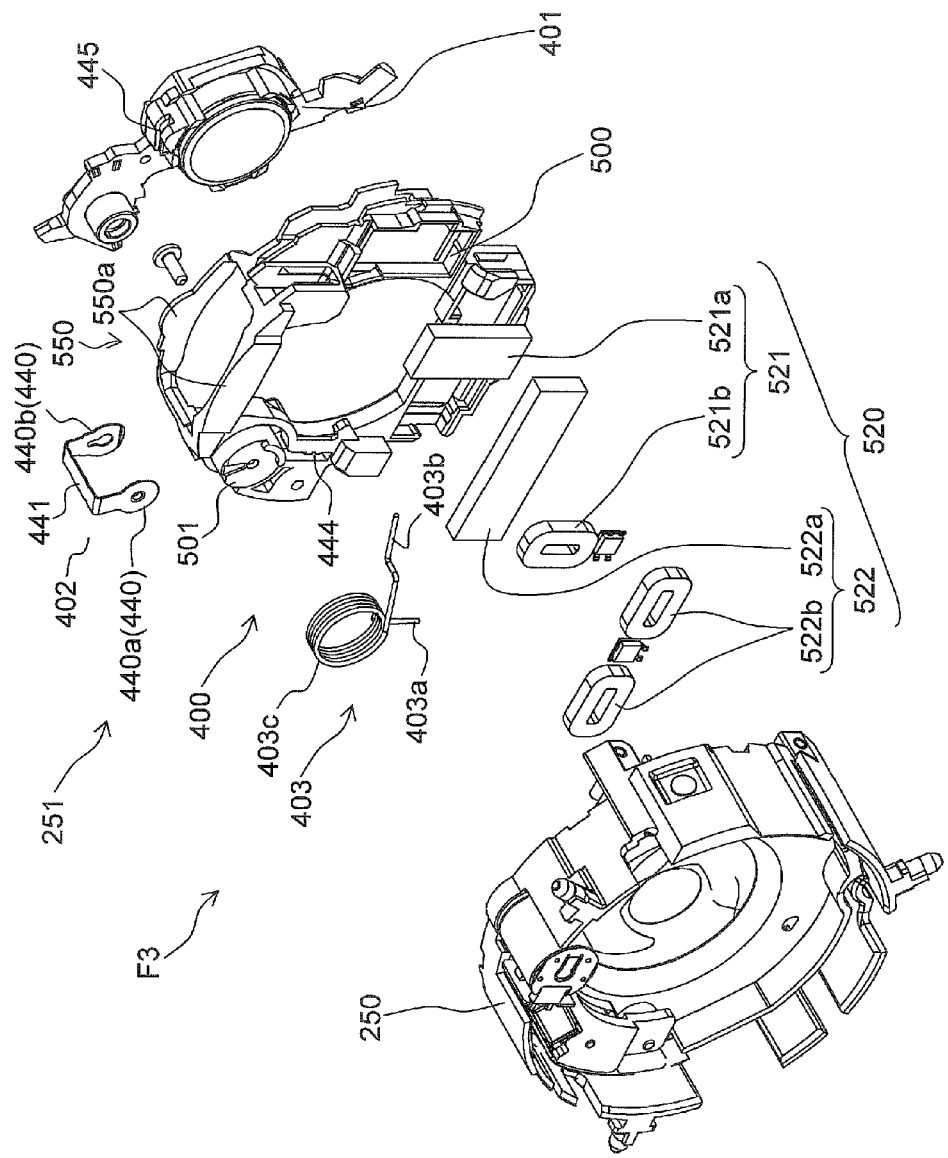
FIG. 8 is an oblique view of the shutter unit, an OIS frame, and a retracting lens frame.

As shown in FIG. 8, a shutter unit 250 is included in the third lens group frame F3. The shutter unit 250 (an example of a second frame body) is engaged with the third rectilinear frame 130 and the first rotary frame 210 as mentioned above. Also, the shutter unit 250 is supported by the master flange 105 (an example of a first frame body).

Figure 9:
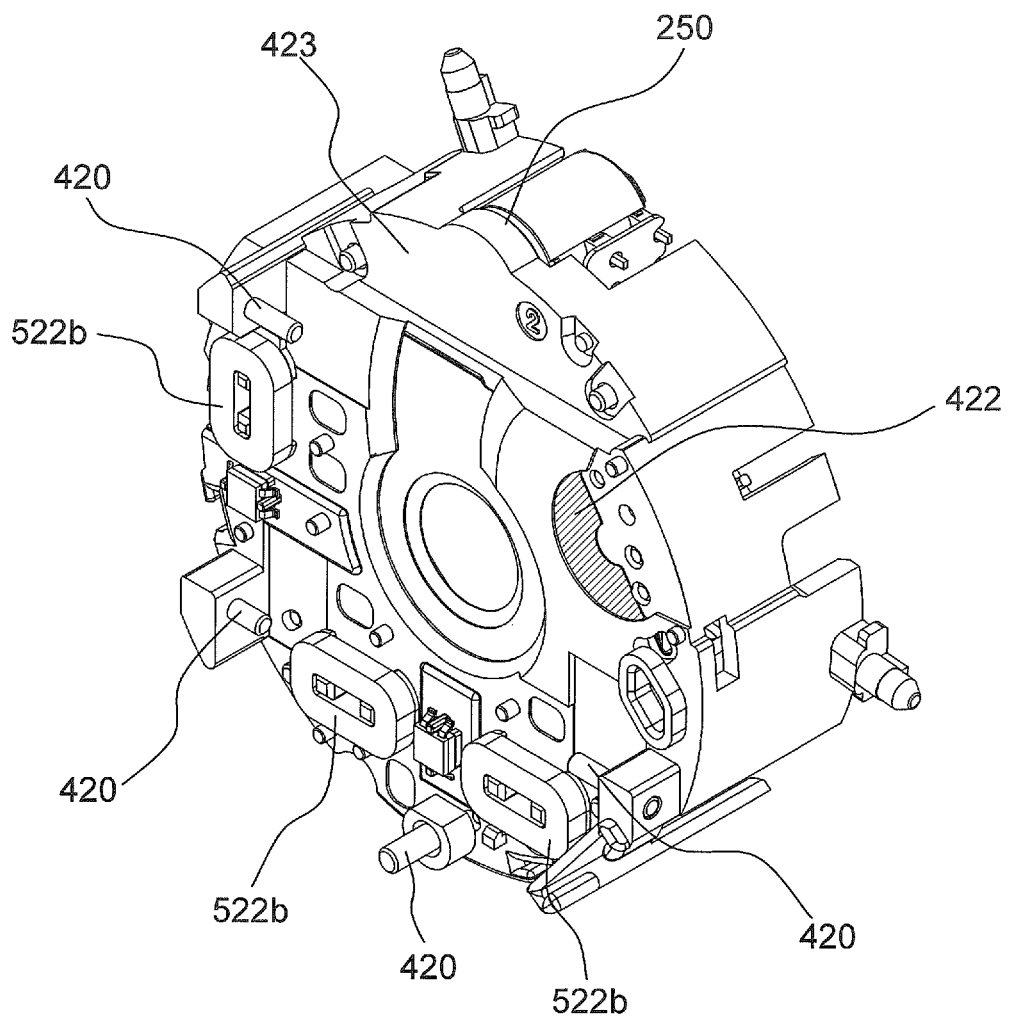
FIG. 9 is a detail oblique view of the shutter unit.

As shown in FIG. 9, the shutter unit 250 has a restrictor 420 (second restrictor) for restricting the movement of the OIS frame 400, and a second stress dispersion portion 422 (the contact portion of the shutter unit) that comes into contact with a first stress dispersion portion 511 (the contact portion of the OIS frame) of the OIS frame 400 (discussed below). The second stress dispersion portion 422 is formed in an arc shape having a specific width. The details of the first stress dispersion portion 511 will be discussed below.

The shutter unit 250 further has a step portion 423. The step portion 423 is formed on the face opposite the OIS frame 400. When the retracting lens frame 401 has changed its orientation (position) from the first orientation to the second orientation (retracted orientation), a housing portion 550 of the retracting lens frame 401 (discussed below) is disposed at the step portion 423. This affords a more compact size in the optical axis direction.

3-2-2. OIS Unit

As shown in FIG. 8, the shutter unit 250 is included in the third lens group frame F3. The OIS unit 251 is disposed between the master flange 105 and the shutter unit 250. The OIS unit 251 is mounted to the shutter unit 250. The OIS unit 251 (an example of a first unit) has the OIS frame 400 (an example of a support frame), the retracting lens frame 401, a thrust spring 402 (an example of a first biasing means), and a rotary spring 403 (an example of a second biasing means, and an example of a biasing member).

OIS Frame

The OIS frame 400 (an example of a support frame) is supported by the shutter unit 250. The OIS frame 400 is configured to be movable within a plane that is perpendicular to the optical axis AX, with respect to the shutter unit 250. The OIS frame 400 is moved by an actuator 520 in a plane that is perpendicular to the optical axis AX.

As shown in FIGS. 8 and 10 to 13, the OIS frame 400 has a main body portion 500 (second main body portion), a retraction shaft portion 501, an anti-rotation portion 502, at least three rail portions 503, and engagement portions 504 (see FIGS. 5 and 6).

As shown in FIG. 8, the second main body portion 500 is substantially in the form of a disk. The second main body portion 500 has the housing portion 550 for housing the retracting lens frame 401. The housing portion 550 has two linking portions 550a that are opposite to each other. The linking portions 550a are formed integrally with the second main body portion 500. More precisely, the linking portions 550a are formed integrally with the second main body portion 500 so that the middle between the two linking portions 550a is disposed in the approximate middle of the shutter unit 250 in the optical axis direction (the approximate middle in the thickness direction).

Figure 11:
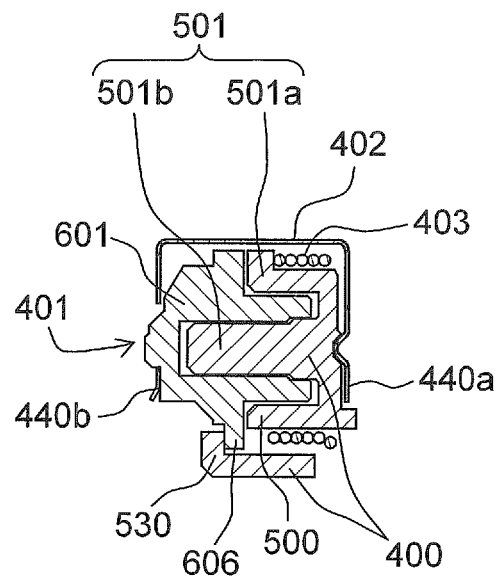
FIG. 11 is a cross section of the area near a shaft support.

As shown in FIGS. 8 and 11, the retraction shaft portion 501 is formed on the second main body portion 500. The retraction shaft portion 501 has a cylindrical part 501a and a retraction shaft 501b. The cylindrical part 501a is formed on the outer peripheral part of the second main body portion 500. The retraction shaft 501b is formed on the second main body portion 500. More specifically, the retraction shaft 501b is formed on the second main body portion 500 so as to protrude toward the inside of the cylindrical part 501a.

Figure 10:
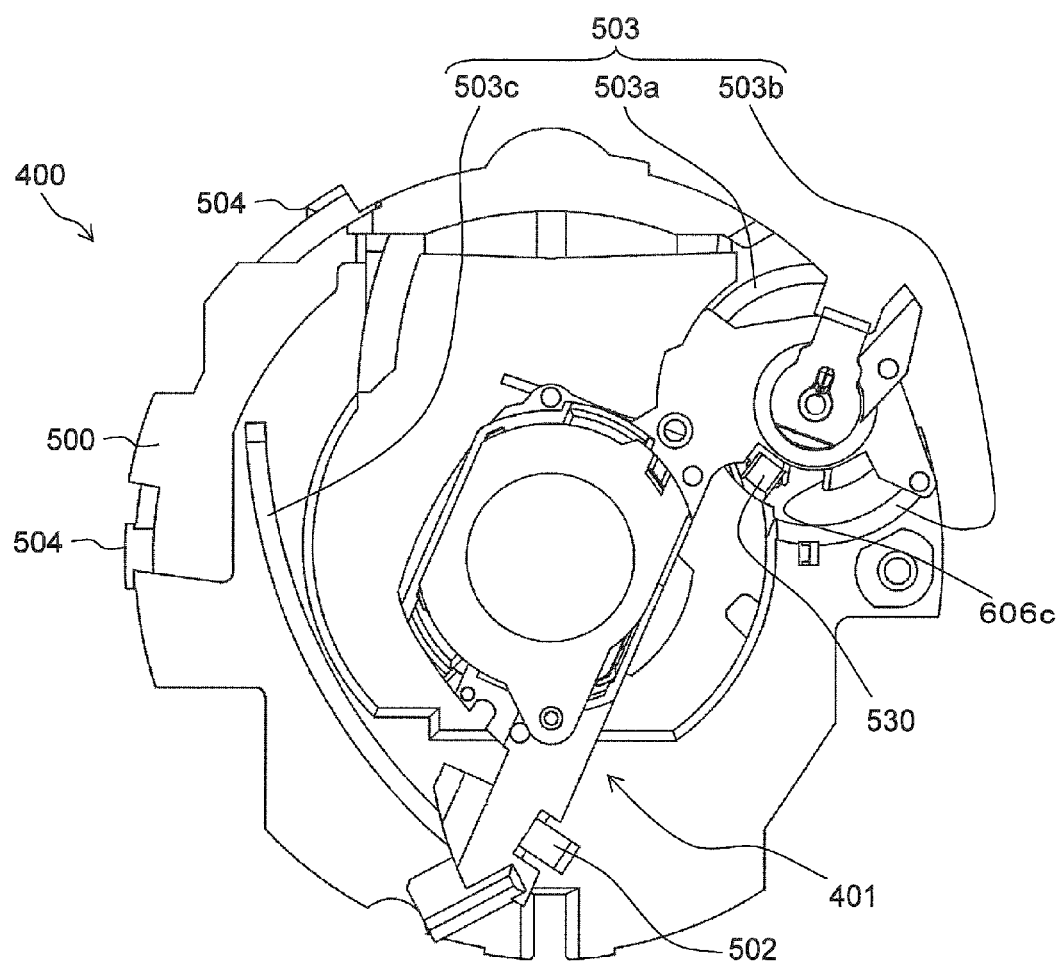
FIG. 10 is a diagram in which the OIS frame to which the retracting lens frame has been mounted is viewed from the imaging element side.
Figure 12:
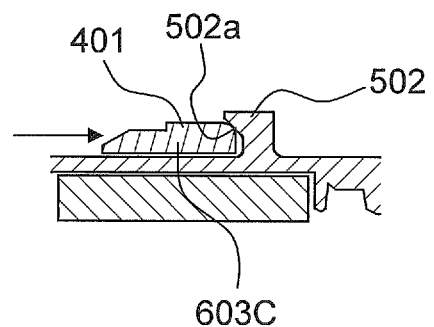
FIG. 12 is a cross section of the area near an anti-rotation portion.

As shown in FIGS. 10 and 12, the anti-rotation portion 502 restricts the movement of the retraction shaft portion 501 produced by the rotary spring 403. The anti-rotation portion 502 is formed protruding outward from the second main body portion 500. The anti-rotation portion 502 has a sloped face 502a. The sloped face 502a is the portion that guides the retracting lens frame 401 toward the OIS frame 400 (the second main body portion 500). The sloped face 502a is sloped in a state of being opposite the second main body portion 500. In other words, the sloped face 502a is sloped with respect to the optical axis AX.

An example in which the sloped face 502a was sloped at one angle was given here, but the sloped face 502a may be formed so that it is sloped in multiple steps. Also, the sloped face 502a may be formed so that it slopes in the form of a curved surface.

Figure 13:
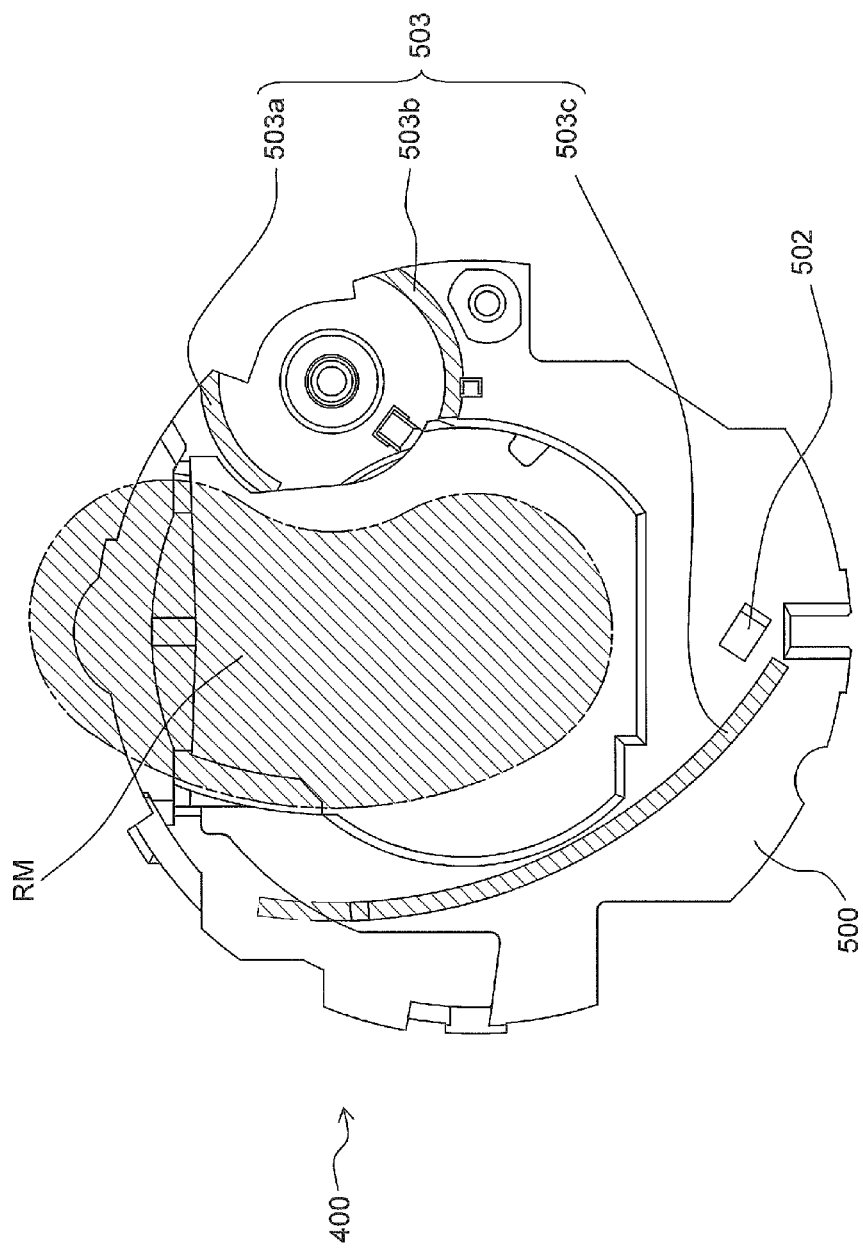
FIG. 13 is a diagram of a rail portion of the OIS frame, and the movement range of a third lens group.

As shown in FIGS. 10 and 13, at least three rail portions 503 (503a to 503c, for example) are formed on the second main body portion 500. The rail portions 503 are formed on one face of the substantially disk-shaped second main body portion 500. The rail portions 503 are formed on the second main body portion 500 at positions opposite contact portions 603 (a first contact portion 603A and a second contact portion 603B; discussed below) formed on the retracting lens frame 401.

Also, as shown in FIG. 13, the rail portions 503 are formed on the second main body portion 500 in a portion that excludes a portion RM where the range over which the third lens group L3 supported by the retracting lens frame 401 moves is projected onto the second main body portion 500, when the OIS frame 400 is viewed in the optical axis direction. Furthermore, the rail portions 503 are formed in a shape that corresponds to the path over when the contact portions 603 (the first contact portion 603A and the second contact portion 603B; discussed below) move when the lens barrel 20 changes from its imaging enabled state to its retracted state.

Figure 14:
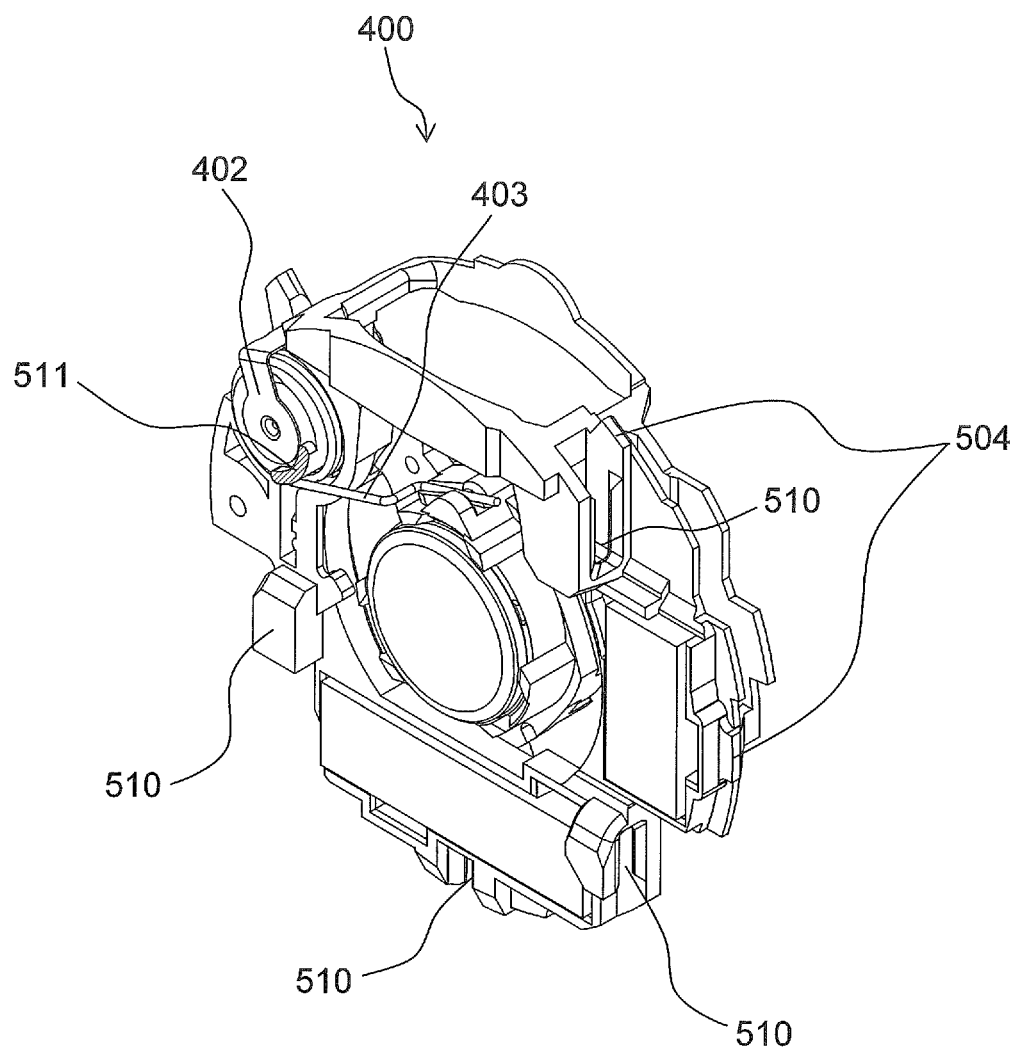
FIG. 14 is an oblique view of the OIS frame to which the retracting lens frame is mounted.

As discussed above, the engagement portions 504 engage with the first restrictor 107 formed on the master flange 105, such as the two protrusions 108 (see FIGS. 5 and 6). As shown in FIGS. 10 and 14, the engagement portions 504 are formed integrally with the second main body portion 500. More specifically, the engagement portions 504 are portions that protrude outward from the outer peripheral part of the second main body portion 500. These two engagement portion 504 respectively engage with the two protrusions 108 of the master flange 105. More specifically, the engagement portions 504 are pressed by the protrusions 108 of the master flange 105. This restricts the in-plane movement of the OIS frame 400.

More precisely, as shown in FIG. 6, when the lens barrel 20 changes from its imaging enabled state to its retracted state, the OIS frame 400 moves in the optical axis direction with respect to the shutter unit 250. The two protrusions 108 of the master flange 105 then respectively engage with the two protrusions of the OIS frame 400, which restricts the in-plane movement of the OIS frame 400. More precisely, first the engagement portions 504 respectively come into contact with the sloped faces formed on the inner peripheral side of the distal ends of the protrusions 108, such as the inner peripheral side of the distal ends of the protrusions 108. Next, the engagement portions 504 come into contact with the inner peripheral parts on the proximal end side of the protrusions 108 (the portion excluding the distal ends and including the middle). This guides the OIS frame 400 from the above-mentioned movable orientation to the movement restricted orientation, and restricts the in-plane movement of the OIS frame 400 in the movement restricted orientation.

In the overall configuration, when the lens barrel 20 changes from its imaging enabled state to its retracted state, the shutter unit 250 and the OIS unit 251 move in the optical axis direction with respect to the master flange 105. This movement of the shutter unit 250 and the OIS unit 251 in the optical axis direction causes the master flange 105 to engage with the OIS frame 400 as discussed above, and restricts the in-plane movement of the OIS frame 400.

As shown in FIG. 14, the OIS frame 400 further has a restricted portion 510 and the first stress dispersion portion 511. The restricted portion 510 is the portion that receives the restrictor 420 of the shutter unit 250. Here, when the restrictor 420 is disposed in the interior of the restricted portion 510, the movement of the second main body portion 500 in the optical axis direction is restricted with respect to the shutter unit 250. Meanwhile, the OIS frame 400 is movable within the plane that is perpendicular to the optical axis AX with respect to the shutter unit 250.

The first stress dispersion portion 511 is the portion that comes into contact with the shutter unit 250 when the pressing portion 605 of the retracting lens frame 401 (discussed below) is pressed. The first stress dispersion portion 511 is provided to the OIS frame 400 at a position closer to the pressing portion 605 than the restricted portion 510. The first stress dispersion portion 511 is formed in an arc shape having a specific width. Here, the width of the first stress dispersion portion 511 is less than the width of the second stress dispersion portion 422. However, the second stress dispersion portion 422 may be formed so that its width becomes less than the width of the first stress dispersion portion 511.

As shown in FIGS. 10 and 11, the OIS frame 400 further has an anti-detachment portion 530 (restrictor of the OIS frame 400). The anti-detachment portion 530 is the portion that restricts detachment of the retracting lens frame 401 from the OIS frame 400 (the second main body portion 500). The anti-detachment portion 530 is formed integrally with the retraction shaft portion 501. The anti-detachment portion 530 is provided a specific distance away from the second main body portion 500. The anti-detachment portion 530 is formed near the retraction shaft 501b.

Retracting Lens Frame

Figure 15A:
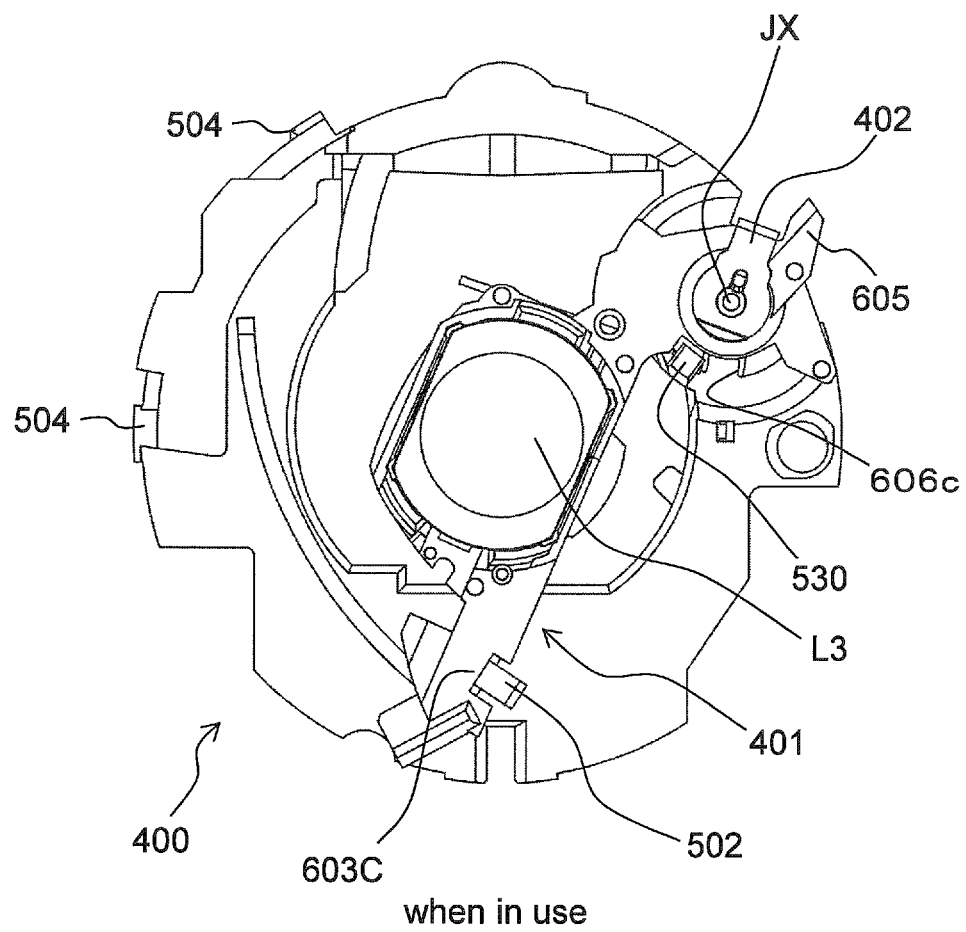
FIG. 15A is a diagram of the OIS frame to which the retracting lens frame is mounted, as viewed from the imaging element side (imaging enabled state)
Figure 15B:
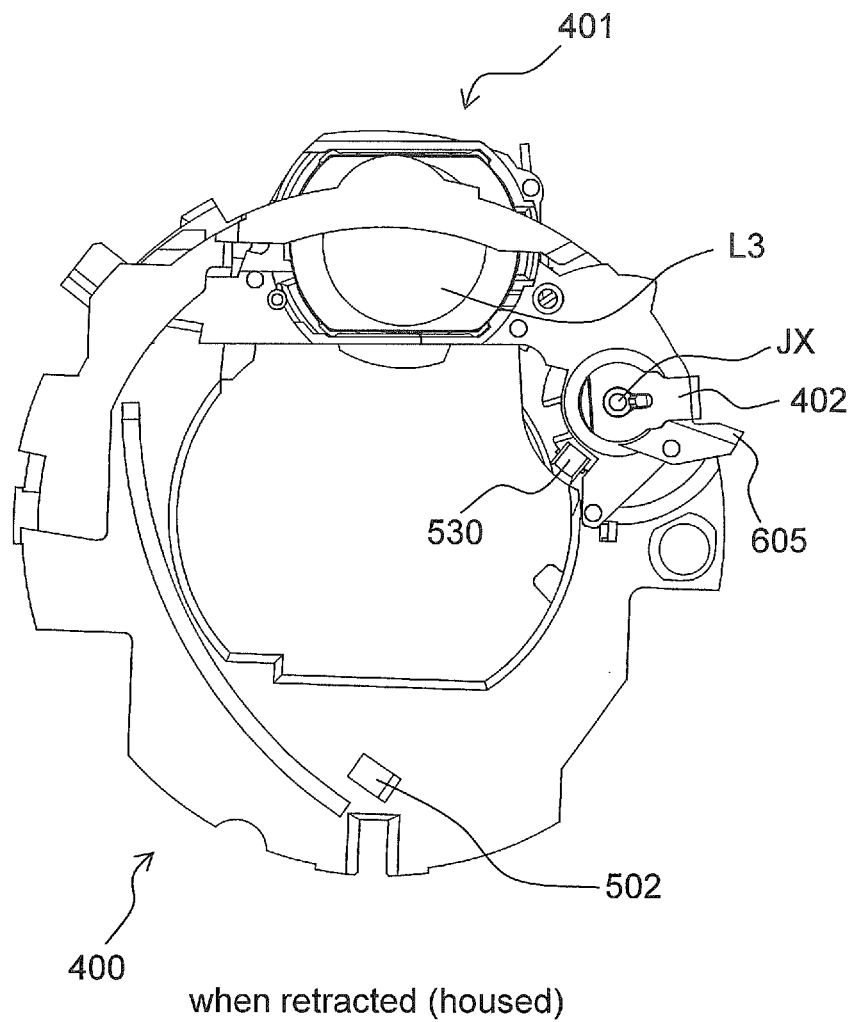
FIG. 15B is a diagram of the OIS frame to which the retracting lens frame is mounted, as viewed from the imaging element side (retracted state)

The retracting lens frame 401 supports at least one lens. As shown in FIGS. 15A and 15B, the retracting lens frame 401 supports the third lens group L3, which is made up of four lenses. The retracting lens frame 401 is supported by the OIS frame 400 (see FIG. 10). The retracting lens frame 401 moves around the retraction shaft 501b, which is substantially parallel to the optical axis AX, when retracting. Consequently, the retracting lens frame 401 is disposed at a position that is shifted from the optical axis AX during retraction.

As shown in FIGS. 15A and 15B, the retracting lens frame 401 moves around the retraction shaft 501b (axis JX) that is substantially parallel to the optical axis AX, when the lens barrel 20 changes from its imaging enabled state to its retracted state. More precisely, the position of the retracting lens frame 401 changes from a first orientation in which the third lens group L3 executes shake correction, to a second orientation in which the third lens group L3 is retracted from the optical axis AX, when the lens barrel 20 changes from its imaging enabled state to its retracted state.

Figure 16:
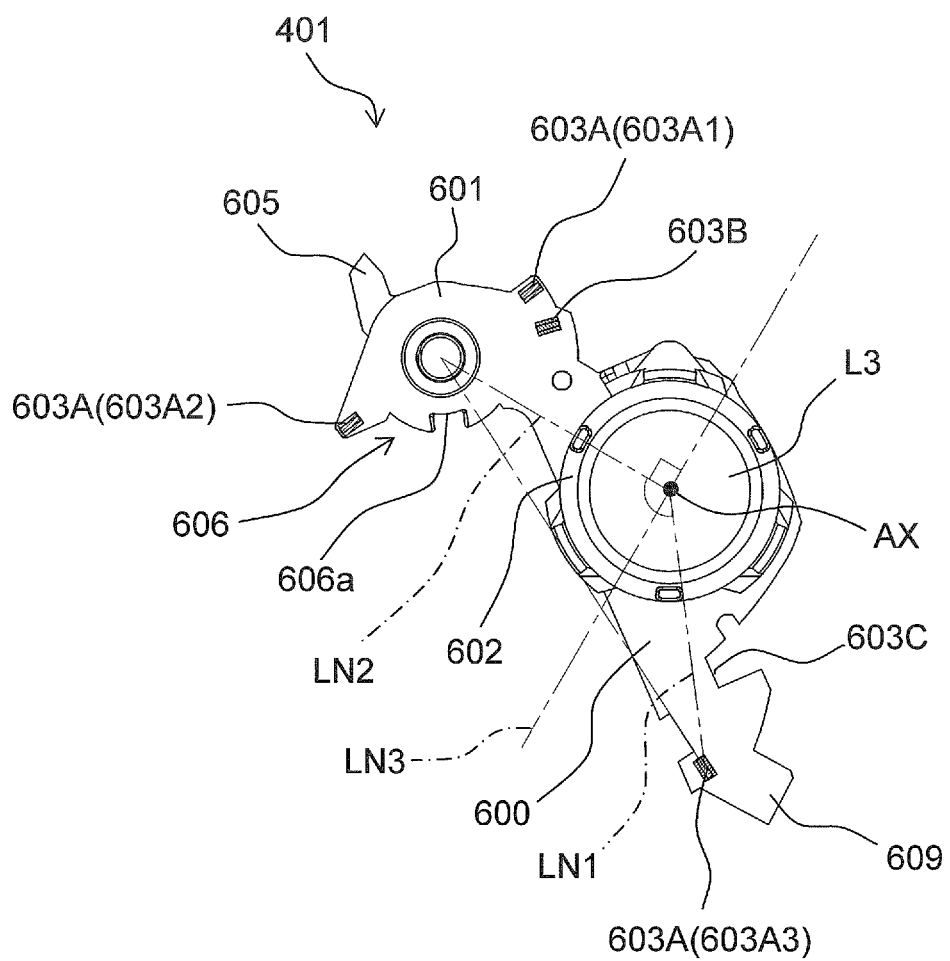
FIG. 16 is a side view of the retracting lens frame.

As shown in FIGS. 16 and 17, the retracting lens frame 401 has a main body portion 600 (third main body portion 600) of the retracting lens frame 401, a shaft support 601 (an example of a bearing), a lens support 602, and the plurality of contact portions 603 (603A to 603C). The shaft support 601 is the portion that engages with the above-mentioned retraction shaft 501b (see FIG. 11). The shaft support 601 rotatably supports the retraction shaft 501b. The shaft support 601 is a hole into which the retraction shaft 501b is inserted, and this hole is formed in the third main body portion 600.

As shown in FIG. 17, the shaft support 601 (hole) has at least two contact faces 601a that come into contact with the retraction shaft 501b. More precisely, the two contact faces 601a are formed on the inner peripheral face of the shaft support 601. The two contact faces 601a are formed on the shaft support 601 on the proximal end side of the retraction shaft 501b, that is, on the opening side of the shaft support 601 (hole) (see FIG. 11). The two contact faces 601a are formed on the inner peripheral face of the shaft support 601 so as to be in a mutually non-parallel relation. More specifically, when viewed in the depth direction, the shaft support 601 (hole) is formed in the inner peripheral face of the shaft support 601 so that the two contact faces 601a are at an angle.

Figure 17A:
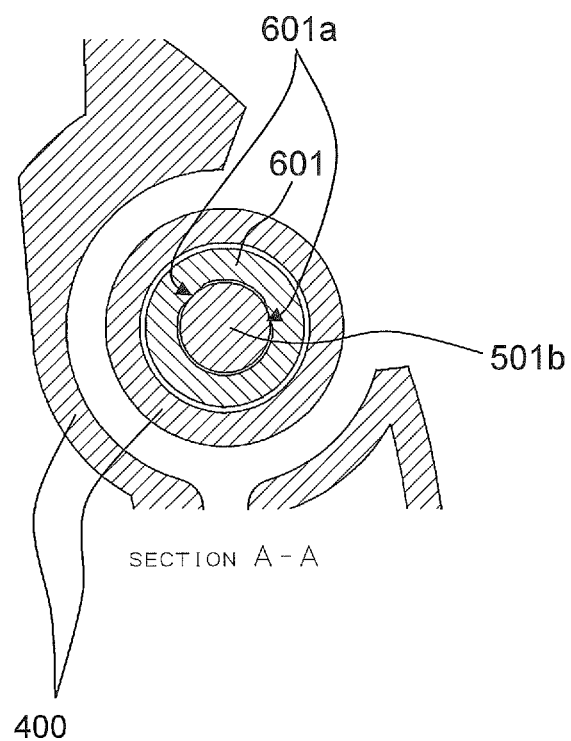
FIG. 17A is a cross section of the support shaft along a plane that is perpendicular to the axis.

As shown in FIG. 17A, the two contact faces 601a (hereinafter referred to as V-faces) come into contact with the outer peripheral face of the retraction shaft 501b. More specifically, as shown in FIG. 17A, the retracting lens frame 401 is biased by the biasing force F0 of the rotary spring 403, and the component force F1 of this biasing force F0 causes the V-faces 601a formed on the shaft support 601 of the retracting lens frame 401 to come into contact with the outer peripheral face of the retraction shaft 501b. This allows the retraction shaft 501b to be positioned accurately with respect to the shaft support 601 of the retracting lens frame 401. More precisely, precision with respect to the eccentricity of the retraction shaft 501b can be improved. In FIG. 17A, F1 and F2 are components of the biasing force F0.

The lens support 602 shown in FIG. 16 is the portion that supports the third lens group L3 (four lenses). The lens support 602 is substantially in cylindrical in form, and supports the third lens group L3 on its inner peripheral part. In a state in which the retracting lens frame 401 has been mounted to the shutter unit 250, the lens support 602 is disposed in the approximate middle of the shutter unit 250 in the optical axis direction (the approximate middle in the thickness direction).

The plurality of contact portions 603 shown in FIG. 16 are, for example, made up of three first contact portions 603A (603A1, 603A2, and 603A3), the second contact portion 603B, and a third contact portion 603C. The three first contact portions 603A, the second contact portion 603B, and the third contact portion 603C are formed on the third main body portion 600 at different positions from the shaft support 601. In other words, the three first contact portions 603A, the second contact portion 603B, and the third contact portion 603C are formed on the third main body portion 600 at different positions from the retraction shaft 501b supported by the shaft support 601. Also, the three first contact portions 603A, the second contact portion 603B, and the third contact portion 603C are formed on the third main body portion 600 at different positions from the retraction shaft 501b so as to allow contact with the OIS frame 400.

More precisely, two of the contact portions 603A1 and 603A2 of the three first contact portions 603A, and the second contact portion 603B are formed on the third main body portion 600 near the retraction shaft 501b. The two contact portions 603A1 and 603A2 are formed on the third main body portion 600 so that the retraction shaft 501b is positioned between these two contact portions 603A1 and 603A2.

The second contact portion 603B is formed on the third main body portion 600 so that the retraction shaft 501b is positioned between one of the two contact portions 603A1 and 603A2 and the second contact portion 603B. Also, the other first contact portion 603A3 besides these two contact portions 603A1 and 603A2, and the third contact portion 603C are formed on the third main body portion 600 at positions that are away from the retraction shaft 501b.

As shown in FIG. 16, a specific first contact portion 603A (603A3) is formed on the third main body portion 600 so that the angle formed by a first line segment LN1 that connects the optical axis AX of the third lens group L3 supported by the lens support 602 to a specific first contact portion 603A, and a second line segment LN2 that connects the optical axis AX of the third lens group L3 supported by the lens support 602 to the retraction shaft 501b becomes an obtuse angle. The "specific first contact portion 603A" is at least one contact portion from among the three first contact portions 603A. Here, the first contact portion 603A3 formed at the position farthest away from the retraction shaft 501b corresponds to the specific first contact portion.

In other words, the first contact portion formed at the position farthest away from the retraction shaft 501b is formed on the third main body portion 600 so that a specific straight line LN3 is disposed between the retraction shaft 501b and the above-mentioned specific first contact portion 603A. The specific straight line LN3 passes through the optical axis AX of the third lens group L3 supported by the lens support 602, and is perpendicular to the second line segment LN2 that connects the retraction shaft 501b to the optical axis AX of the third lens group L3 supported by the lens support 602.

Figure 18:
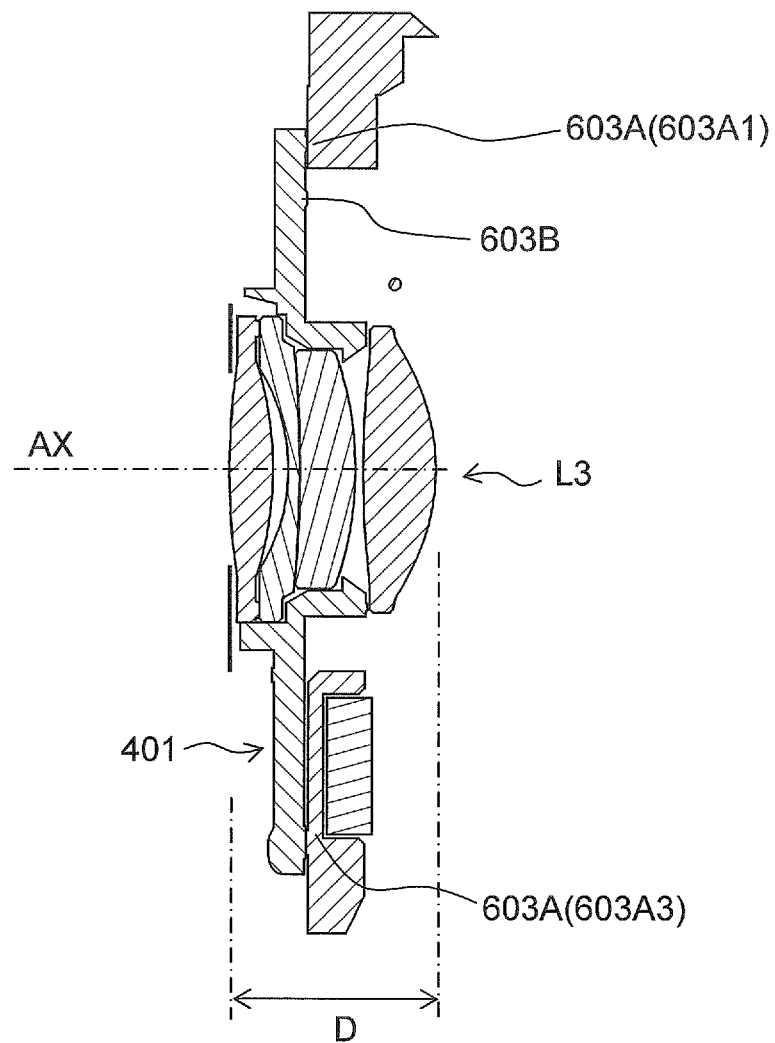
FIG. 18 is a cross section of the positional relation between a third lens group and a contact portion.

As shown in FIG. 18, at least one of the three first contact portions 603A (603A1, 603A2, and 603A3), the second contact portion 603B, and the third contact portion 603C is formed on the third main body portion 600 so as to overlap the third lens group L3 in a direction perpendicular to the optical axis AX. In other words, at least one of the three first contact portions 603A, the second contact portion 603B, and the third contact portion 603C is provided to the retracting lens frame 401 so as to overlap the third lens group L3 within a range D of the thickness of the third lens group L3. Here, the three first contact portions 603A, the second contact portion 603B, and the third contact portion 603C are provided to the retracting lens frame 401 so as to overlap the third lens group L3 in a direction perpendicular to the optical axis AX within the range D of the thickness of the third lens group L3.

Here, at least three of the three first contact portions 603A (603A1, 603A2, and 603A3), the second contact portion 603B, and the third contact portion 603C is configured to come into contact with the OIS frame 400. Specifically, if at least three contact portions out of the three first contact portions 603A and the second contact portion 603B come into contact with the OIS frame 400, this restricts the movement of the retracting lens frame 401 in the optical axis direction.

More precisely, if at least three contact portions out of the three first contact portions 603A and the second contact portion 603B come into contact with the rail portions 503 of the OIS frame 400 (see FIG. 14), this restricts the movement of the retracting lens frame 401 in the optical axis direction. More specifically, when the lens barrel 20 is in its imaging enabled state, the three first contact portions 603A1, 603A2, and 603A3 respectively come into contact with the rail portions 503a, 503b, and 503c of the OIS frame 400. Here, the first contact portion 603A1 comes into contact with the rail portion 503a, the first contact portion 603A2 comes into contact with the rail portion 503b, and the first contact portion 603A3 comes into contact with the rail portion 503c. In this case, the second contact portion 603B does not come into contact with the rail portions 503.

On the other hand, when the lens barrel 20 is in its retracted state, the two first contact portions 603A2 and 603A3 and the second contact portion 603B respectively come into contact with the rail portions 503a, 503b, and 503c of the OIS frame 400. Here, when the lens barrel 20 has changed from the imaging enabled state to the retracted state, one of the three first contact portions 603A, such as the first contact portion 603A1, separates from the rail portion 503, and the second contact portion 603B comes into contact with that rail portion 503. Thus having at least three contact portions out of the three first contact portions 603A and the second contact portion 603B come into contact with the rail portions 503 of the OIS frame 400 reliably restricts the movement of the retracting lens frame 401 in the optical axis direction.

The third contact portion 603C comes into contact with the OIS frame 400 when the lens barrel 20 changes from the imaging enabled state to the retracted state. This will be discussed in detail below.

As shown in FIG. 16, the retracting lens frame 401 further has the pressing portion 605 and an engagement portion 606. The pressing portion 605 is the portion that is pressed when the retracting lens frame 401 changes from the imaging enabled state to the retracted state. More precisely, when the retracting lens frame 401 changes from the imaging enabled state to the retracted state, the pressing portion 605 is pressed by the first retracting cam 125 and the second retracting cam 126 provided to the master flange (see FIG. 5). When the pressing portion 605 is thus pressed, the load exerted on the restrictor 420 and the restricted portion 510 is limited by allowing the first stress dispersion portion 511 (FIG. 14) and the second stress dispersion portion 422 (see FIG. 9) to come into contact with each other.

The engagement portion 606 is the portion that engages with the anti-detachment portion 530. At the retracting lens frame 401, if the engagement portion 606 is disposed between the second main body portion 500 (the main body portion of the OIS frame 400) and the anti-detachment portion 530 (see FIG. 11), detachment of the retracting lens frame 401 in the optical axis direction is restricted. As shown in FIG. 16, the engagement portion 606 is formed integrally with the shaft support 601. The engagement portion 606 is formed in an arc shape. A cut-out 606c is formed in the engagement portion 606. The engagement portion 606 is disposed between the anti-detachment portion 530 and the third main body portion 600 by introducing the anti-detachment portion 530 into the cut-out 606c.

Thrust Spring

The thrust spring 402 is a spring that biases the retracting lens frame 401 with respect to the OIS frame 400. As shown in FIGS. 8 and 11, the thrust spring 402 is mounted to the OIS frame 400 and/or the retracting lens frame 401.

The thrust spring 402 has a pair of opposing parts 440 and a linking portion 441 that links the two opposing parts 440. One of the two opposing parts 440 (the first opposing part 440a) is mounted to the OIS frame 400, and the other opposing part 440 (the second opposing part 440b) is mounted to the retracting lens frame 401. More precisely, as shown in FIG. 11, in a state in which the retraction shaft 501b of the OIS frame 400 is supported by the shaft support 601 of the retracting lens frame 401, the first opposing part 440a is mounted to the OIS frame 400, and the second opposing part 440b is mounted to the retracting lens frame 401. Consequently, the thrust spring 402 clamps the OIS frame 400 and the retracting lens frame 401.

Consequently, the thrust spring 402 brings at least two of the contact portions 603 into contact with the OIS frame 400. Here, the thrust spring 402 brings at least two of the contact portions out of the two first contact portions 603A (603A1 and 603A2) and the second contact portion 603B formed near the retraction shaft 501b (the shaft support 601) into contact with the OIS frame 400.

Rotary Spring

Figure 17B:
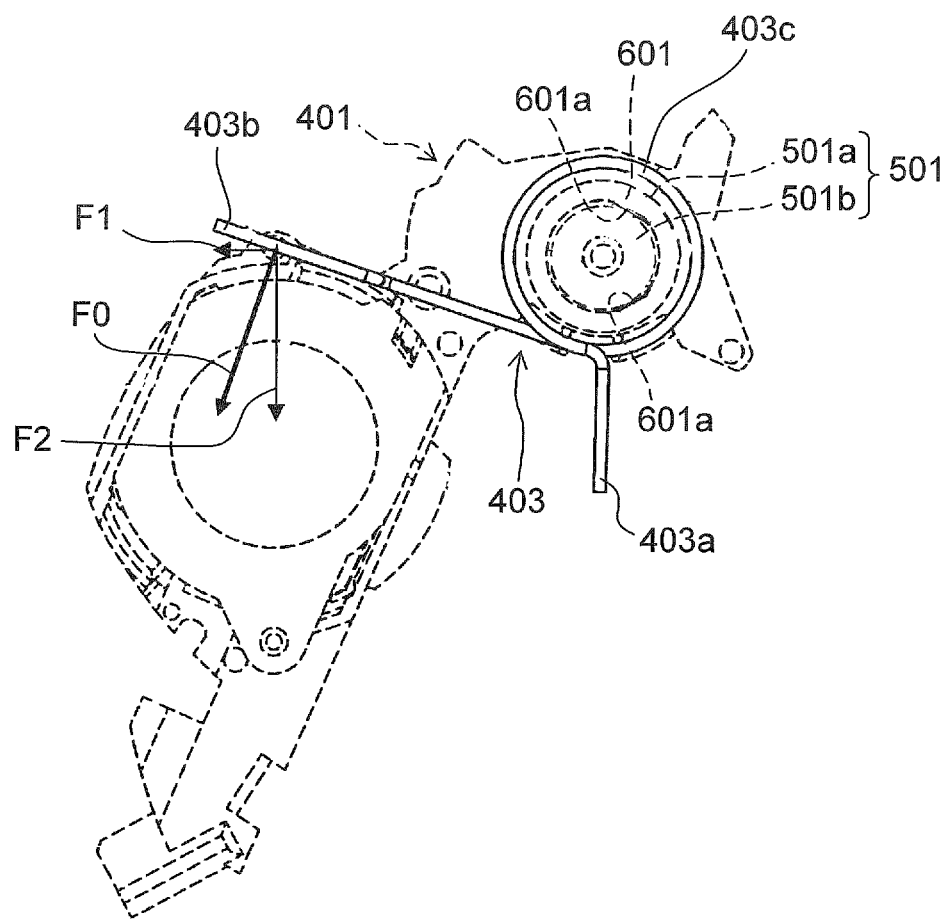
FIG. 17B is a diagram of the correspondence between the retracting lens frame and a rotary spring (part 1)

The rotary spring 403 is a spring that biases the retracting lens frame 401 around the retraction shaft 501b. The rotary spring 403 shown in FIG. 8 is supported by the OIS frame 400. The rotary spring 403 is a torsion coil spring, for example. As shown in FIGS. 11 and 17B, a portion 403c of the coil of the rotary spring 403 (the coil part) is mounted around the outside of the cylindrical part 501a of the retraction shaft portion 501. One end 403a of the rotary spring 403 is mounted in a groove 444 formed in the OIS frame 400. The other end 403b of the rotary spring 403 is mounted in a groove 445 formed in the retracting lens frame 401.

When the rotary spring 403 biases the retracting lens frame 401, the third contact portion 603C of the retracting lens frame 401 comes into contact with the sloped face 502a of the OIS frame 400. The third contact portion 603C is then guided by the sloped face 502a, and the retracting lens frame 401 approaches the OIS frame 400. This positions the retracting lens frame 401 with respect to the OIS frame 400. In this state, the first contact portion 603A3 is in contact with the OIS frame 400.

As shown in FIG. 17b, in this embodiment, when the rotary spring 403 is viewed in the center axis direction of the coil part 403c, the other end 403B of the rotary spring 403 is in the form of a straight line. Instead, as shown in FIG. 17C, the distal end 403b2 of the other end 403B of the rotary spring 403 may be bent with respect to the proximal end 403b1 (the portion near the coil part 403c).

More specifically, using the proximal end 403b1 of the rotary spring 403 as a reference, the distal end 403b2 of the rotary spring 403 is bent. In other words, using the proximal end 403b1 as a reference, the distal end 403b2 is bent in the rotation direction of the retracting lens frame 401. Even more specifically, using the proximal end 403b1 as a reference, the distal end 403b2 is bent so as to move closer to the coil part 403c.

In this case, a spring receiver 607 is formed on the retracting lens frame 401, and the distal end 403b2 of the other end 403B of the rotary spring 403 comes into contact with this spring receiver 607.

Figure 17C:
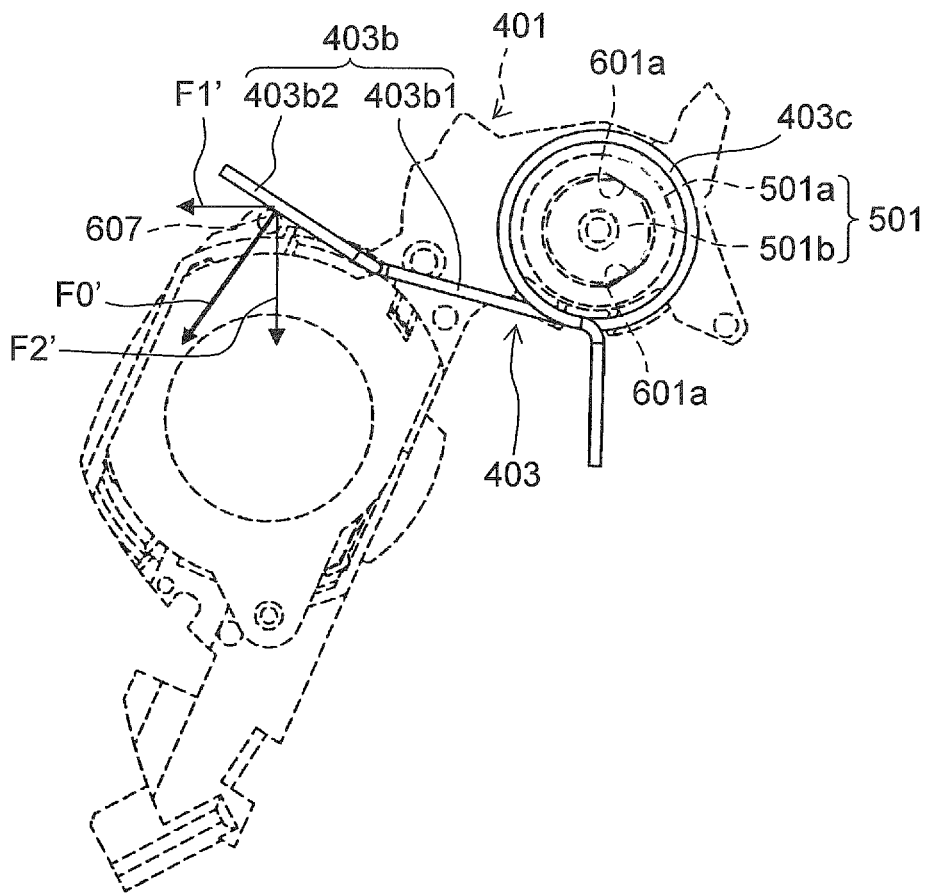
FIG. 17C is a diagram of the correspondence between the retracting lens frame and a rotary spring (part 2)

As a result of this configuration, as shown in FIG. 17C, the component force F1' of the biasing force F0' of the rotary spring 403 causes the V-faces 601a formed in the shaft support 601 of the retracting lens frame 401 to come into contact with the outer peripheral face of the retraction shaft 501b. In FIG. 17C, the component force F1' at which the V-faces 601a of the retracting lens frame 401 are brought into contact with the outer peripheral face of the retraction shaft 501b is greater than that in FIG. 17B (F1'>F1). Consequently, the retraction shaft 501b is positioned more reliably with respect to the shaft support 601 of the retracting lens frame 401. More precisely, accuracy with respect to the eccentricity of the retraction shaft 501b can be improved more reliably. In FIG. 17C, F1' and F2' are components of the biasing force F0'.

The amount and direction of the component force F1' by which the V-faces 601a are biased toward the retraction shaft vary with the position where the V-faces are formed. Specifically, the bending of the rotary spring 403 and the formation position of the V-faces 601a in FIG. 17B are just examples given to illustrate this technology. Therefore, the bending of the rotary spring 403 is not limited to how it is done in this embodiment, and any way is fine as long as the component force F1' by which the V-face are biased toward the retraction shaft can be increased.

3-3. Actuator

Figure 19:
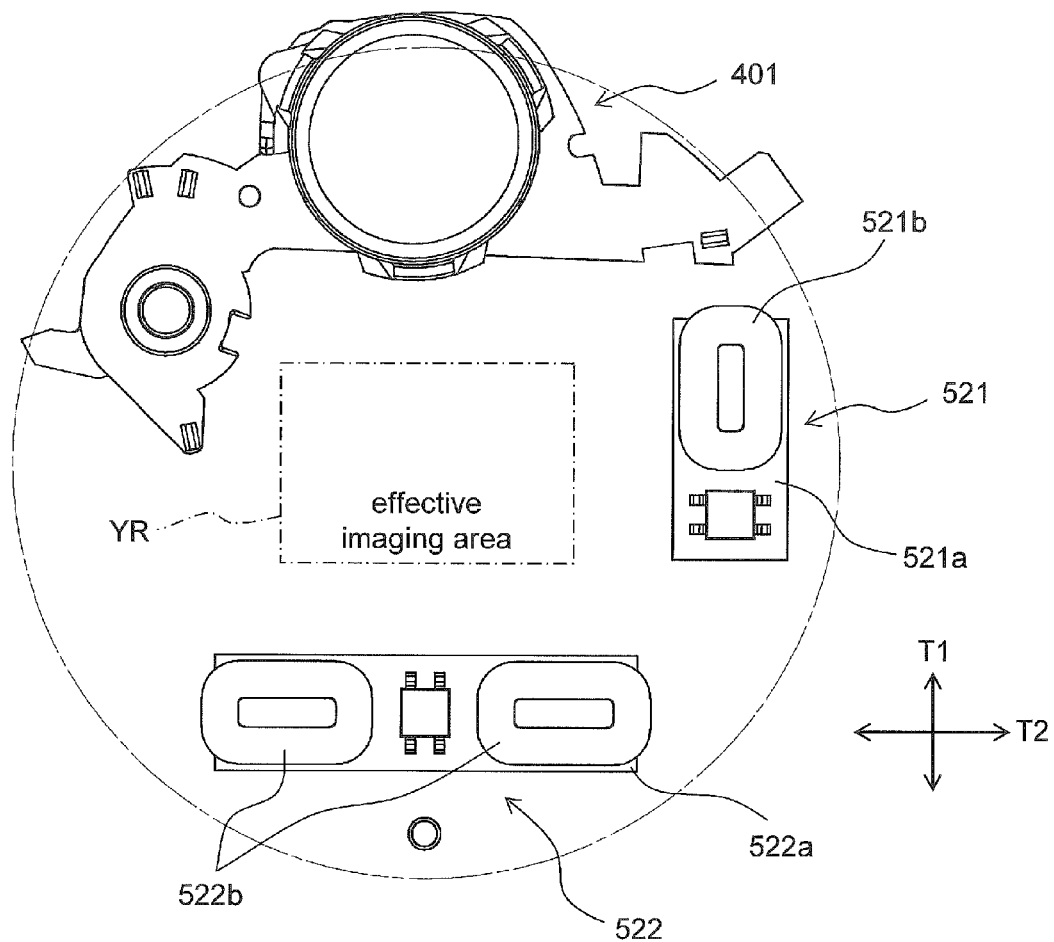
FIG. 19 is a diagram of the layout of an actuator and the retracting lens frame.
Figure 20:
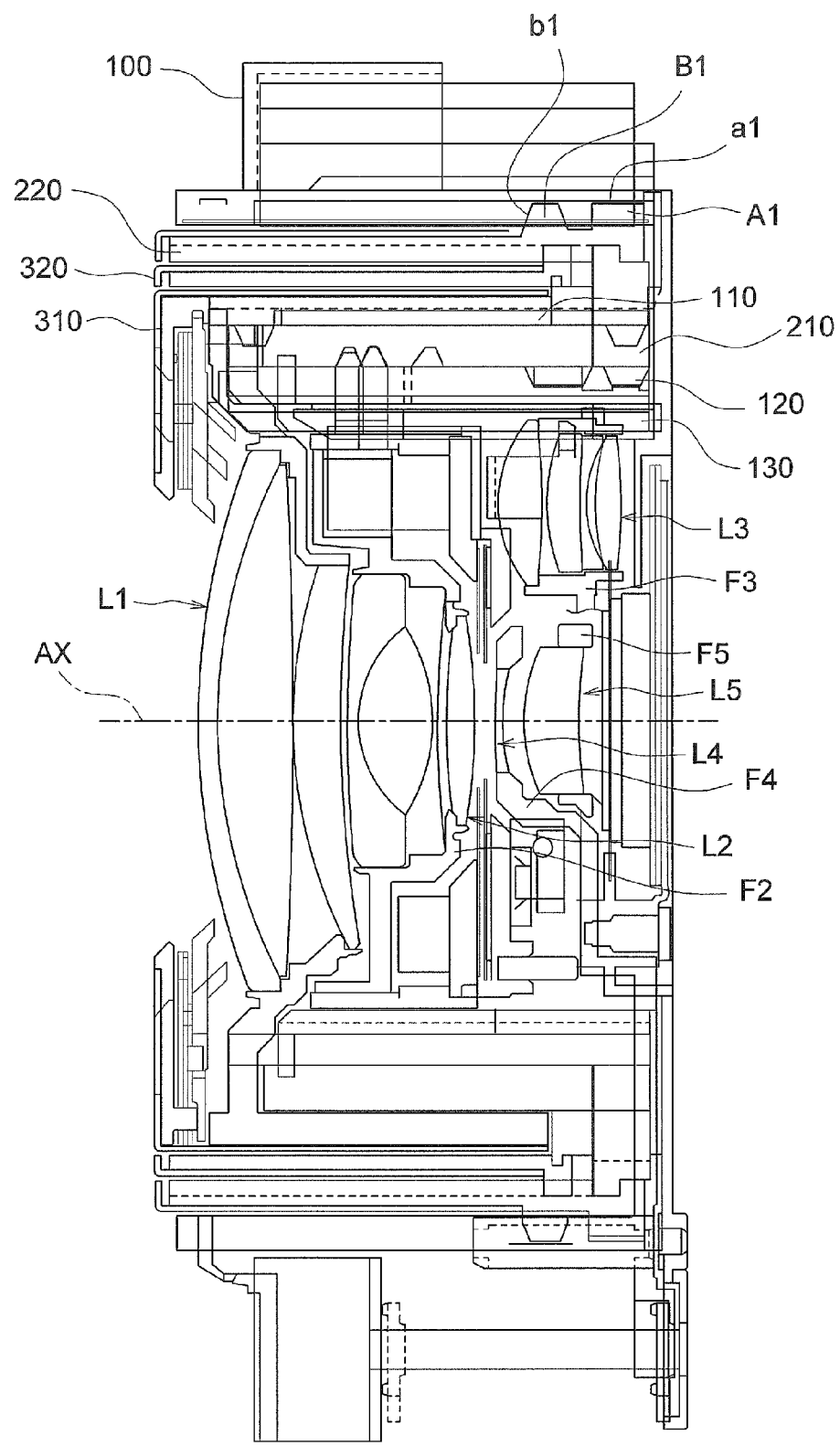
FIG. 20 is a simplified cross section of the lens group in its retracted state.
Figure 21:
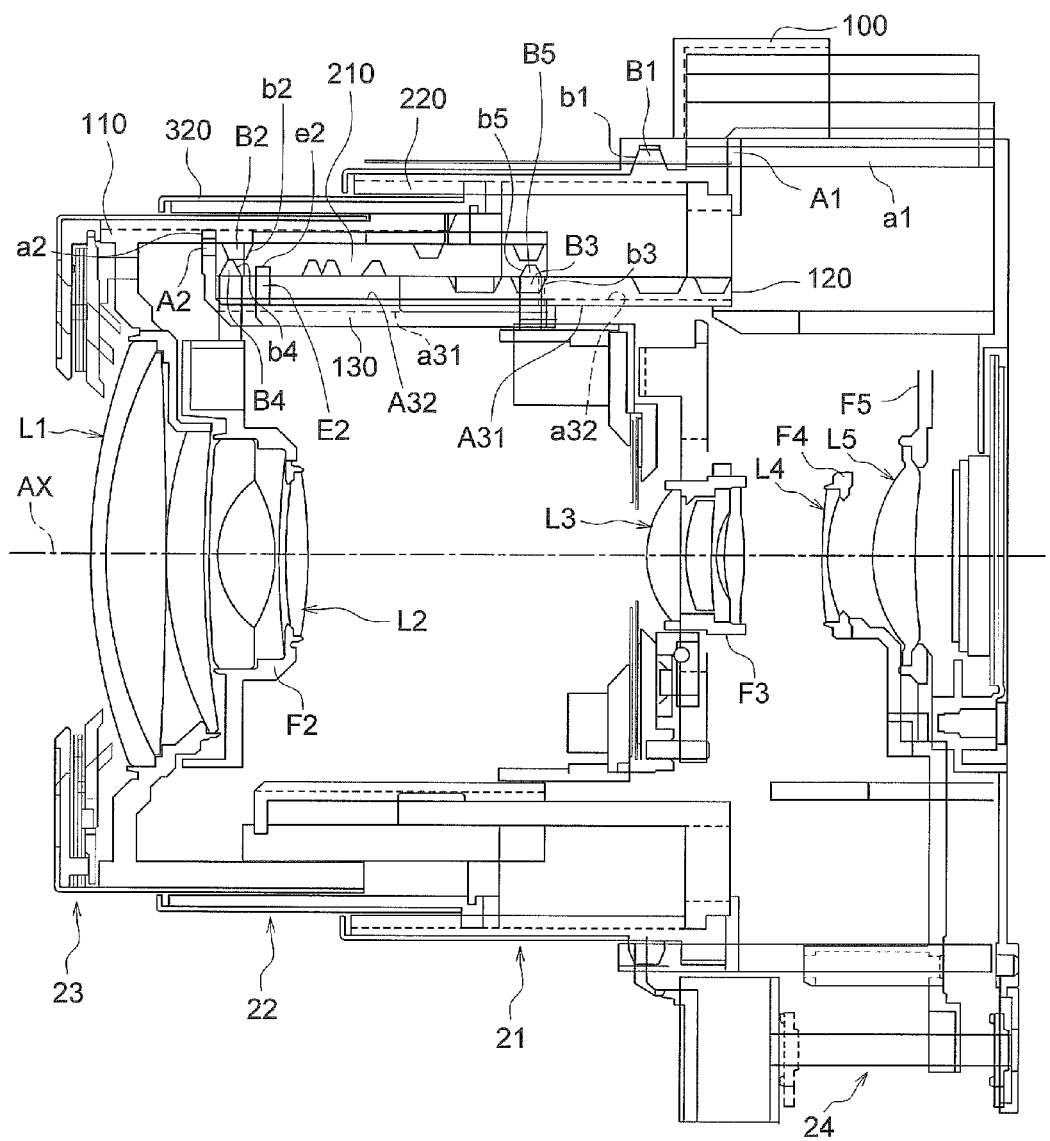
FIG. 21 is a simplified cross section of the lens group in its wide angle state.
Figure 22:
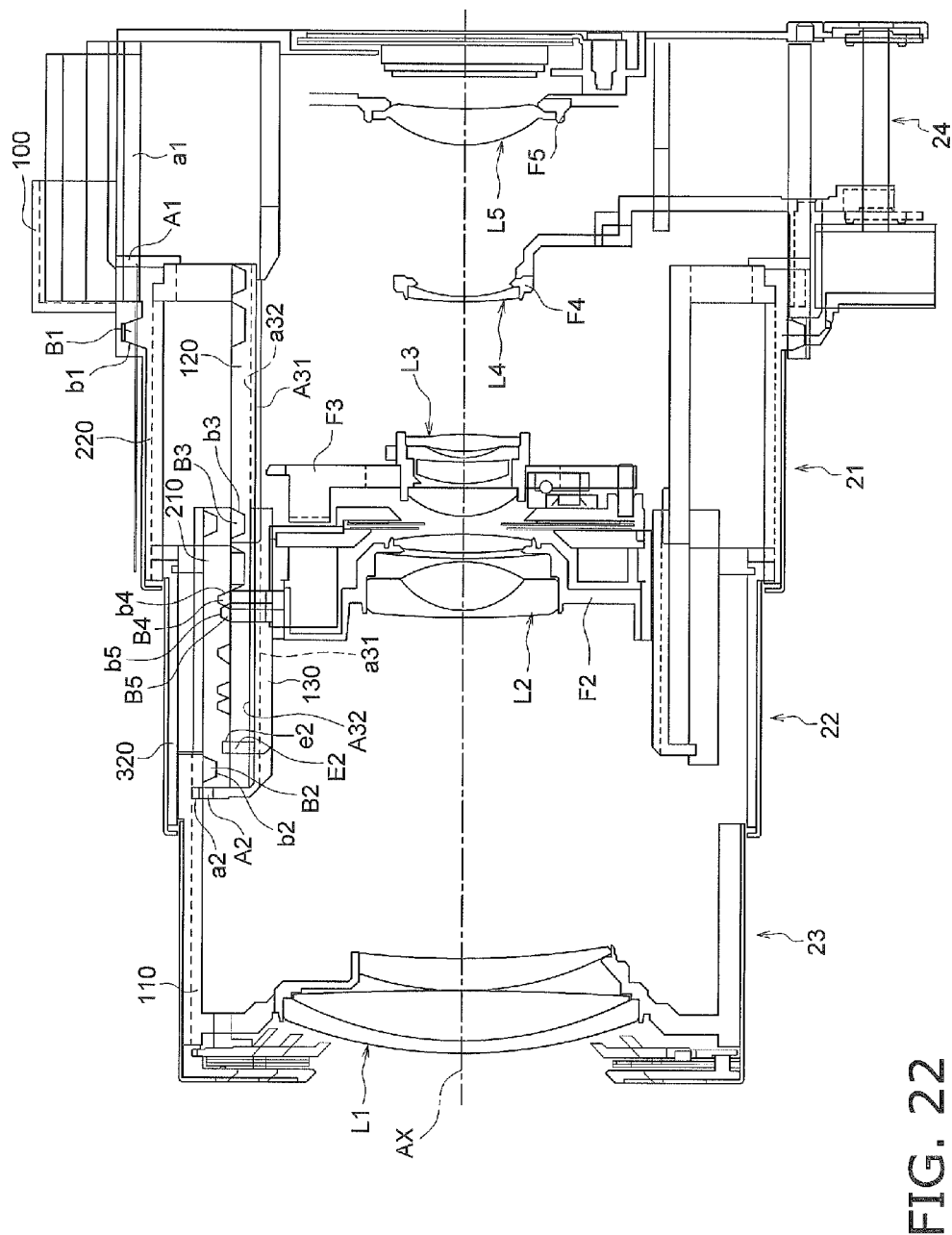
FIG. 22 is a simplified cross section of the lens group in its telephoto state.

The actuator 520 is mounted to the third lens group frame F3. More precisely, as shown in FIG. 19, the actuator 520 is disposed on the third lens group frame F3, using an effective imaging range YR as a reference. The effective imaging range YR is defined by the imaging element 103 mounted to the master flange 105. In this embodiment, the effective imaging range YR is formed in a rectangular shape.

As shown in FIG. 19, the actuator 520 has a first actuator 521 and a second actuator 522. The first actuator 521 moves the OIS frame 400 in a short-side direction T1 (first direction) of the effective imaging range YR. The first actuator 521 is disposed on one short side of the effective imaging range YR. The first actuator 521 is made up of a magnet 521a and a coil 521b. The magnet 521a is mounted to the OIS frame 400, and the coil 521b is mounted to the shutter unit 250 at a position opposite the magnet 521a.

As shown in FIG. 19, the second actuator 522 moves the OIS frame 400 in a long-side direction T2 (second direction) of the effective imaging range YR. The second actuator 522 is larger than the first actuator 521. The second actuator 522 is disposed on one long side of the effective imaging range YR. More specifically, the second actuator 522 is disposed on the lower long side of the effective imaging range YR. The second actuator 522 is made up of a magnet 522a and two coils 522b. The magnet 522a is mounted to the OIS frame 400, and the two coils 522b are mounted to the shutter unit 250 at a position opposite the magnet 522a. The retracting lens frame 401 moves along the other long side of the effective imaging range YR (such as the upper long side).

In this state, when power is supplied from a camera circuit (not shown) to the coils 521b and 522b of the shutter unit 250, current flows and a magnetic field is generated in the coils 521b and 522b. This magnetic field drives the magnets 521a and 522a of the OIS frame 400, and this drive force causes the OIS frame 400 to move in a plane that is perpendicular to the optical axis AX. More precisely, the OIS frame 400 is moved by the first actuator 521 in the short-side direction, and is moved by the second actuator 522 in the long-side direction.

4. Engagement of Frames

FIGS. 5 to 7 are cross sections of the lens barrel 20. However, FIGS. 5 to 7 are simplified diagrams that combine a plurality of cross sections passing through the optical axis AX. In FIG. 5 the lens barrel 20 is shown in its retracted state, in FIG. 6 the lens barrel 20 is shown in its wide angle state, and in FIG. 7 the lens barrel 20 is shown in its telephoto state.

As shown in FIG. 5, in the retracted state, the second rotary frame 220, the second cosmetic frame 320, the first cosmetic frame 310, the first rectilinear frame 110, the first rotary frame 210, the second rectilinear frame 120, and the third rectilinear frame 130 are housed in that order on the inside in the radial direction of the stationary frame 100. Also, in the retracted state, the third lens group L3 retracts outward in the radial direction of the fourth and fifth lens groups L4 and L5, which allows the lens barrel 20 to be more compact in the optical axis direction.

The engagement of the frames will now be described through reference to FIGS. 6 and 7.

The gear part 221 of the second rotary frame 220 meshes with the zoom gear 102 (not shown). The cam protrusion B1 of the second rotary frame 220 is engaged with the cam groove b1 of the stationary frame 100. Consequently, the second rotary frame 220 moves in the optical axis direction while rotating in the peripheral direction under the drive force of the zoom motor 101.

The rectilinear protrusion A1 of the second rectilinear frame 120 is engaged with the rectilinear groove a1 of the stationary frame 100. The bayonet protrusion E1 of the second rectilinear frame 120 is engaged with the bayonet groove e1 of the second rotary frame 220. Therefore, the second rectilinear frame 120 moves in the optical axis direction along with the second rotary frame 220.

The rectilinear protrusion A4 of the first rotary frame 210 is engaged with the rectilinear groove a4 of the first rotary frame 210. The cam protrusion B3 of the first rotary frame 210 is engaged with the cam groove b3 of the second rectilinear frame 120. Therefore, the first rotary frame 210 moves in the optical axis direction along with the second rectilinear frame 120 while rotating in the peripheral direction along with the first rotary frame 210.

The cam protrusion B2 of the first rectilinear frame 110 is engaged with the cam groove b2 of the first rotary frame 210. The rectilinear protrusion A2 of the third rectilinear frame 130 is engaged with the rectilinear groove a2 of the first rectilinear frame 110. Therefore, the first rectilinear frame 110 moves in the optical axis direction according to the rotation of the first rotary frame 210.

The bayonet protrusion E2 of the third rectilinear frame 130 is engaged with the bayonet groove e2 of the second rotary frame 220. The rectilinear protrusion A2 of the third rectilinear frame 130 is engaged with the rectilinear groove a2 of the first rectilinear frame 110. Therefore, the third rectilinear frame 130 moves in the optical axis direction along with the first rotary frame 210.

As discussed above, the first rotary frame 210 is engaged with the first rectilinear frame 110 via a cam mechanism, and rotates to move the first rectilinear frame 110 rectilinearly. Also, the second rectilinear frame 120 is engaged with the first rotary frame 210 via a cam mechanism, and moves rectilinearly in the optical axis direction to rotate the first rotary frame 210. Accordingly, the first rotary frame 210 is moved by moving the second rectilinear frame 120 rectilinearly while moving the first rectilinear frame 110 rectilinearly by rotating the first rotary frame 210, by rotating the second rotary frame 220 with the zoom motor 101. As a result, the first to third movable lens barrel parts 21 to 23 are deployed smoothly from the stationary lens barrel part 24.

5. Operation of OIS Unit

Finally, the operation of the OIS unit will be described on the basis of the configuration of the lens barrel 20 discussed above.

First, as shown in FIG. 15A, in the imaging enabled state, the third contact portion 603C of the retracting lens frame 401 comes into contact with the anti-rotation portion 502, which positions the retracting lens frame 401 with respect to the OIS frame 400 in the first orientation (imaging enabled orientation).

Next, when the lens barrel 20 starts changing from its imaging enabled state to its retracted state, the shutter unit 250 approaches the master flange 105 as shown in FIG. 6. The engagement portions 504 of the OIS frame 400 mounted to the shutter unit 250 then come into contact with the distal ends of the protrusions 108 provided to the master flange 105. The distal ends of the protrusions 108 then press on the OIS frame 400. Once the engagement portions 504 of the OIS frame 400 come into contact with the inner peripheral part of the protrusions 108 (the portion more to the proximal end side than the distal end), movement of the OIS frame 400 with respect to the shutter unit 250 is restricted.

Meanwhile, in a state in which the OIS frame 400 is being pressed by the protrusions 108 of the master flange 105, the pressing portion 605 of the retracting lens frame 401 is pressed and guided by the first retracting cam 125 provided to the master flange 105.

More precisely, in a state in which the OIS frame 400 is being pressed by the distal ends of the protrusions 108, the pressing portion 605 of the retracting lens frame 401 comes into contact with and is guided by the first guide portion 125a of the first retracting cam 125 (see FIG. 7), causing the retracting lens frame 401 to start retracting from the first orientation toward the second orientation (retracted orientation).

Then, in a state in which the OIS frame 400 is being pressed by the inner peripheral part on the proximal end side of the protrusions 108 (the portion excluding the distal ends and including the middle), the pressing portion 605 of the retracting lens frame 401 comes into contact with and is guided by the second guide portion 125b of the first retracting cam 125 (see FIG. 7), causing the retracting lens frame 401 to retract further. The pressing portion 605 of the retracting lens frame 401 then comes into contact with the support portion 125c of the first retracting cam 125 (see FIG. 7).

Finally, when the shutter unit 250 further approaches the master flange 105, a positioning portion 609 provided to the retracting lens frame 401 comes into contact with the second retracting cam 126. This positions the retracting lens frame 401 in the retracted position.

Here, the direction in which the protrusions 108 of the master flange 105 press on the engagement portions 504 of the OIS frame 400 is substantially the same as the direction in which the first retracting cam 125 of the master flange 105 presses on the pressing portion 605 of the retracting lens frame 401. In other words, the protrusions 108 of the master flange 105 and the first retracting cam 125 of the master flange 105 press on the engagement portions 504 of the OIS frame 400 and the first retracting cam 125 of the retracting lens frame 401 in the direction in which the OIS frame 400 approaches the shutter unit 250. Thus pressing the engagement portions 504 of the OIS frame 400 and the first retracting cam 125 of the retracting lens frame 401 in substantially the same direction allows the retracting lens frame 401 to be positioned reliably.

Thus, the movement of the OIS frame 400 with respect to the shutter unit 250 is restricted, and the retracting lens frame 401 is positioned with respect to the OIS frame 400 in the second orientation (retracted orientation). At this point, the lens support 602 of the retracting lens frame 401 is housed in the housing portion 550 of the OIS frame 400.

Thus, with this lens barrel 20, when the lens barrel 20 changes from its imaging enabled state to its retracted state, the restriction of movement of the OIS frame 400 and the positioning of the retracting lens frame 401 are executed simultaneously. Specifically, the lens barrel 20 of this embodiment retracts the third lens group L3 used for OIS. Here again, movement of the OIS frame 400 itself is restricted with a restricting mechanism that restricts the movement of the OIS frame 400 (e.g., the relation between the inner peripheral part of the protrusions 108 and the engagement portions 504 of the OIS frame 400), before the third lens group L3 is retracted with a retracting mechanism (e.g., the relation between the pressing portion 605 of the retracting lens frame 401 and the first retracting cam 125 provided to the master flange 105). This allows the third lens group L3 to be retracted more reliably.

6. Action and Effect (1-1) This lens barrel 20 comprises the OIS frame 400 and a retracting lens frame 401. The retracting lens frame 401 supports a third lens group L3. The retracting lens frame 401 moves around a retraction shaft 501b substantially parallel to the optical axis, with respect to the OIS frame 400 during a transition period between the imaging enabled state and the housed state. The retracting lens frame 401 has at least three contact portions 603. The three or more contact portions 603 come into contact with the OIS frame 400 at positions that are different from the retraction shaft 501b. When the contact portions 603 come into contact with the OIS frame 400, movement of the retracting lens frame 401 in the optical axis direction is restricted. At least one of the contact portions 603 is provided to the retracting lens frame 401 so as to overlap the lens L3 in a direction perpendicular to the optical axis.

With this lens barrel 20, at least one of the contact portions 603 (603A to 603C) and the third lens group L3 (retracting lens) are disposed so as to overlap each other in a direction perpendicular to the optical axis AX. This allows the OIS unit made up of the OIS frame 400 and the retracting lens frame 401 to be smaller in the optical axis direction. Specifically, the lens barrel 20 can be made smaller (thinner) in the optical axis direction.

Also, with this lens barrel 20, at least one of the contact portions 603 (603A to 603C) and the third lens group L3 (retracting lens) are disposed so as to overlap each other in a direction perpendicular to the optical axis AX. That is, the contact face of the contact portion 603 is disposed at a position near the center of gravity of the retracting lens frame 401 in a direction perpendicular to the optical axis. Consequently, when the retracting lens frame 401 moves around the retraction shaft, it can move in a state in which the accuracy of the third lens group L3 in the optical axis is maintained.

(1-2) This lens barrel 20 comprises a thrust spring 402. The thrust spring 402 is fixed to the OIS frame 400, and biases the retracting lens frame 401 with respect to the OIS frame 400. The thrust spring 402 brings at least two of the contact portions 603 into contact with the OIS frame 400.

With this lens barrel 20, because the thrust spring 402 biases the retracting lens frame 401 with respect to the OIS frame 400, two or more of the contact portions 603 (603A to 603C) can be brought into contact with the retracting lens frame 401. This reliably ensures good vertical accuracy (inclination accuracy, tilt accuracy, etc.) of the retracting lens frame 401 (the retracting lens L3).

(1-3) This lens barrel 20 further comprises a rotary spring 403. The rotary spring 403 is fixed to the OIS frame 400, and biases the retracting lens frame 401 around the retraction shaft 501b. The OIS frame 400 has an anti-rotation portion 502. The anti-rotation portion 502 restricts movement of the retracting lens frame 401 by the rotary spring 403. The anti-rotation portion 502 has a sloped face 502a that is sloped with respect to the optical axis. When the retracting lens frame 401 is biased by the rotary spring 403, one of the three or more contact portions 603 comes into contact with the sloped face 502a, and this guides the retracting lens frame 401 toward the OIS frame 400.

With this lens barrel 20, when the retracting lens frame 401 is biased by the rotary spring 403, one of the contact portions 603 (603C) hits the sloped face 502a of the anti-rotation portion 502, and the retracting lens frame 401 is guided toward the OIS frame 400. This presses the retracting lens frame 401 toward the OIS frame 400. Specifically, the contact portions 603 of the retracting lens frame 401 reliably come into contact with the OIS frame 400.

(1-4) With this lens barrel 20, at least one of the contact portions 603 is provided to the retracting lens frame 401 so as to overlap the third lens group L3 in a direction perpendicular to the optical axis Ax within the thickness range of the lens group L3.

With this lens barrel 20, at least one of the contact portions 603 (603A to 603C) overlaps the lens in a direction perpendicular to the optical axis AX within the thickness range of the third lens group L3. Consequently, the OIS unit made up of the OIS frame 400 and the retracting lens frame 401 can be smaller in the optical axis direction. Specifically, the lens barrel 20 can be made smaller (thinner) in the optical axis direction.

(1-5) With this lens barrel 20, at least three of four contact portions 603 can come into contact with the OIS frame 400.

With this lens barrel 20, three of the four contact portions 603 (603A to 603D) are configured to come into contact with the retracting lens frame 401. For example, in the imaging enabled state, three contact portions 603A1, 603A2, and 603A3 are configured to come into contact with corresponding rail portions 503. In the retracted state, the three contact portions 603B, 603A2, and 603A3 are configured to come into contact with corresponding rail portions 503. Specifically, with this lens barrel 20, the contact portions (603A to 603C) that come into contact with the rail portions 503 can be changed according to the state. This allows three-point support at all times, even if the shape of the retracting lens frame 401 and/or the shape of the OIS frame 400 is complex.

(1-6) With this lens barrel 20, two contact portions 603 are in contact with the OIS frame 400 on both sides of a straight line LN2 linking the retraction shaft 501b and the third lens group L3, so the tilt accuracy of the retracting lens frame 401 can be improved.

(2) In prior art, the protrusions on the subsidiary optical system holder (corresponds to the retracting lens frame) formed near the subsidiary optical system are perpendicular to a straight line linking the retraction shaft and the optical axis, and are formed on a straight line that passes through the optical axis (see FIG. 6). This makes it difficult to ensure good vertical accuracy of the subsidiary optical system holder.

The technology disclosed herein was conceived in light of the above problem, and it is an object of the present technology to reliably ensure good vertical accuracy of the retracting lens frame.

The lens barrel disclosed herein comprises a support frame and a retracting lens frame. The retracting lens frame supports a lens and moves around a retraction shaft substantially parallel to the optical axis, with respect to the support frame during a transition period between an imaging enabled state and a housed state. The retracting lens frame has at least three contact portions. The three or more contact portions come into contact with the support frame at positions that are different from the retraction shaft. When the contact portions come into contact with the support frame, movement of the retracting lens frame in the optical axis direction is restricted. At least one of the contact portions is provided to the retracting lens frame so that the angle formed by a line segment linking the one or more contact portions and the optical axis of the lens and a line segment linking the retraction shaft and the optical axis of the lens is an obtuse angle.

The technology disclosed herein provides a lens barrel with which good vertical accuracy of the retracting lens frame can be reliably ensured.

The configuration and effect discussed above will now be described in specific terms.

(2-1) This lens barrel 20 comprises the OIS frame 400 and the retracting lens frame 401. The retracting lens frame 401 has the third lens group L3. The retracting lens frame 401 moves around the retraction shaft 501b that is substantially parallel to the optical axis, with respect to the OIS frame 400 during a transition period between an imaging enabled state and a housed state. The retracting lens frame 401 has at least three contact portions 603. The three or more contact portions 603 come into contact with the OIS frame 400 at positions that are different from the retraction shaft 501b. When the contact portions 603 come into contact with the OIS frame 400, movement of the retracting lens frame 401 in the optical axis direction is restricted. At least one of the contact portions 603 is provided to the retracting lens frame 401 so that the angle formed by a line segment LN1 linking at least one of the contact portions 603 and the optical axis of the third lens group L3 and a line segment LN2 linking the retraction shaft 501b and the optical axis of the third lens group L3 is an obtuse angle.

With this lens barrel 20, at least one of the contact portions 603 (603A, 603A3) is provided to the retracting lens frame 401 so that the angle formed by the line segment LN1 linking the one or more contact portions 603 and the lens L3 and the line segment LN2 linking the retraction shaft 501 and the lens L3 is an obtuse angle. Consequently, at least one of the contact portions 603 (603A, 603A3) can be disposed outside the retracting lens L3, so good vertical accuracy (inclination accuracy, tilt accuracy) of the retracting lens frame 401 (the retracting lens L3) can be reliably ensured. In other words, accuracy is easier to manage.

(2-2) This lens barrel 20 further comprises the thrust spring 402. The thrust spring 402 is fixed to the OIS frame 400, and biases the retracting lens frame 401 with respect to the OIS frame 400. The thrust spring 402 brings at least two of the contact portions 603 into contact with the OIS frame 400.

With this lens barrel 20, because the thrust spring 402 biases the retracting lens frame 401 with respect to the OIS frame 400, two or more of the contact portions 603 (603A to 603C) can be brought into contact with the retracting lens frame 401. This reliably ensures good vertical accuracy (inclination accuracy, tilt accuracy, etc.) of the retracting lens frame 401 (the retracting lens L3).

(2-3) This lens barrel 20 further comprises the rotary spring 403. The rotary spring 403 is fixed to the OIS frame 400, and biases the retracting lens frame 401 around the retraction shaft 501b. The OIS frame 400 has the anti-rotation portion 502. The anti-rotation portion 502 restricts movement of the retracting lens frame 401 by the rotary spring 403. The anti-rotation portion 502 has at least one sloped face 502a that is sloped with respect to the optical axis. When the retracting lens frame 401 is biased by the rotary spring 403, one of the three or more contact portions 603 comes into contact with the sloped face 502a, and this guides the retracting lens frame 401 toward the OIS frame 400.

With this lens barrel 20, when the retracting lens frame 401 is biased by the rotary spring 403, one of the contact portions 603 (603C) hits the sloped face 502a of the anti-rotation portion 502, and the retracting lens frame 401 is guided toward the OIS frame 400. This presses the retracting lens frame 401 toward the OIS frame 400. Specifically, the contact portions 603 of the retracting lens frame 401 reliably come into contact with the OIS frame 400.

(2-4) With this lens barrel 20, at least one of the contact portions 603 is provided to the retracting lens frame 401 so that a straight line LN3, which passes through the optical axis of the third lens group L3 and is perpendicular to the line segment LN2 linking the retraction shaft 501b and the optical axis of the third lens group L3, is located between the retraction shaft 501b and the one or more contact portions 603.

Consequently, at least one of the contact portions 603 (603A, 603A3) can be disposed outside of the retracting lens L3, so good vertical accuracy (inclination accuracy, tilt accuracy) of the retracting lens frame 401 (the retracting lens L3) can be reliably ensured. In other words, accuracy is easier to manage.

(3) In prior art, the protrusions formed on the subordinate optical system holder (corresponds to the retracting lens frame) do not come into contact with the member supporting the subsidiary optical system holder between the imaging state and the retracted state. Accordingly, if some kind or external force or the like should be generated while the subsidiary optical system holder is moving from the imaging state to the retracted state, there is the risk that unwanted looseness or the like will occur in the subsidiary optical system holder.

The technology disclosed herein was conceived in light of the above problem, and it is an object of the present technology to allow the retracting lens frame to move stably from the imaging state to the retracted state.

The lens barrel disclosed herein comprises a support frame and a retracting lens frame. The retracting lens frame supports a lens, and moves around a retraction shaft substantially parallel to the optical axis, with respect to the support frame during a transition period between an imaging enabled state and a housed state. The retracting lens frame has at least three contact portions. The three or more contact portions come into contact with the support frame at positions that are different from the retraction shaft. The support frame has at least three rail portions. The three or more rail portions are formed at positions corresponding to the three or more contact portions during a transition period between the imaging enabled state and the housed state. When the contact portions come into contact with the rail portions, this restricts movement of the retracting lens frame in the optical axis direction.

The technology disclosed herein provides a lens barrel with which a retracting lens frame can move stably.

The technology disclosed herein provides a lens barrel with which good vertical accuracy can be reliably ensured for a retracting lens frame.

The configuration and effect discussed above will now be described in specific terms.

(3-1) This lens barrel 20 comprises the OIS frame 400 and the retracting lens frame 401. The retracting lens frame 401 supports the third lens group L3. The retracting lens frame 401 moves around the retraction shaft 501b, which is substantially parallel to the optical axis, with respect to the OIS frame 400 during a transition period between an imaging enabled state and a housed state. The retracting lens frame 401 has at least three contact portions 603. The three or more contact portions 603 come into contact with the OIS frame 400 at positions that are different from the retraction shaft 501b. The three or more rail portions 503 are formed at positions that are opposite the three or more contact portions 603 during a transition period between an imaging enabled state and a housed state. When the contact portions 603 hit the rail portions 503, this restricts movement of the retracting lens frame 401 in the optical axis direction.

With this lens barrel 20, the contact portions 603 are configured to come into contact with the rail portions 503 of the OIS frame 400 between the imaging enabled state and the retracted state. Consequently, even if some kind or external force or the like should be generated between the imaging enabled state (or retracted state) and the retracted state (or imaging enabled state), the retracting lens frame 401 can still be moved stably. In other words, the retracting lens frame 401 can be stably guided by the rail portions 503 between the imaging enabled state (or retracted state) and the retracted state (or imaging enabled state).

Thus forming the rail portions 503 on the OIS frame 400 stably ensures the proper orientation of the retracting lens frame 401 even if the OIS frame 400 has a complex shape (even f the portion corresponding to the contact portions 603 is uneven).

(3-2) This lens barrel 20 further comprises the thrust spring 402. The thrust spring 402 is fixed to the OIS frame 400, and biases the retracting lens frame 401 with respect to the OIS frame 400. The thrust spring 402 brings at least two of the contact portions 603 into contact with the OIS frame 400.

With this lens barrel 20, because the thrust spring 402 biases the retracting lens frame 401 with respect to the OIS frame 400, two or more of the contact portions 603 (603A to 603C) can be brought into contact with the retracting lens frame 401. This reliably ensures good vertical accuracy (inclination accuracy, tilt accuracy, etc.) of the retracting lens frame 401 (the retracting lens L3).

(3-3) This lens barrel 20 further comprises the rotary spring 403. The rotary spring 403 is fixed to the OIS frame 400, and biases the retracting lens frame 401 around the retraction shaft 501b. The OIS frame 400 has an anti-rotation portion 502. The anti-rotation portion 502 restricts movement of the retracting lens frame 401 by the rotary spring 403. The anti-rotation portion 502 has at least one sloped face 502a that is sloped with respect to the optical axis. When the retracting lens frame 401 is biased by the rotary spring 403, one of the three or more contact portions 603 comes into contact with the sloped face 502a, and this guides the retracting lens frame 401 toward the OIS frame 400.

With this lens barrel 20, when the retracting lens frame 401 is biased by the rotary spring 403, one of the contact portions 603 (603C) hits the sloped face 502a of the anti-rotation portion 502, and the retracting lens frame 401 is guided toward the OIS frame 400. This presses the retracting lens frame 401 toward the OIS frame 400. Specifically, the contact portions 603 of the retracting lens frame 401 reliably come into contact with the OIS frame 400.

(3-4) With this lens barrel 20, when the rail portions 503 are viewed in the optical axis direction, the rail portions 503 are formed on the OIS frame 400 at positions outside the range of movement of the third lens group L3.

With this lens barrel 20, the rail portions 503 are formed on a second main body portion 500 at a portion excluding the range of movement RM of the third lens group L3. Consequently, the retracting lens frame 401 is supported at three points at all times between the imaging enabled state (or retracted state) and the retracted state (or imaging enabled state).

(4) In the past, a lens barrel was disclosed in which a blur correction lens group chamber could be retracted outside of a fourth lens group chamber in a direction perpendicular to the optical axis (see Japanese Laid-Open Patent Application 2007-163961).

With this prior art, the blur correction lens group chamber (corresponds to a retracting lens frame) was shifted in a direction perpendicular to the optical axis by a blur correction mechanism in the imaging state. This reduced image blurring. In the housed state, this blur correction lens group chamber was retracted out of the fourth lens group chamber.

With this prior art, when image blurring is corrected in the imaging state, a spring that was more powerful than in the past had to be used to support the blur correction lens group chamber so that the blur correction lens group chamber would not shift in the retraction direction. Specifically, when the blur correction lens group chamber was rotated and retracted, a greater pressing force than in the past was necessary. Accordingly, when the blur correction lens group chamber was rotated, there was the risk that the portion supporting the blur correction lens group chamber, such as the blur correction mechanism part of a third lens group barrel (the rotary shaft of a diaphragm) would not be able to withstand this pressing force and would end up being deformed. That is, there was the risk that the operation of the third lens group barrel (OIS frame) would end up being unstable.

The technology disclosed herein was conceived in light of the above problems, and it is an object of the present technology to allow the OIS to operate stably even when a retracting lens frame is mounted to the OIS frame.

The lens barrel disclosed herein comprises a frame body, a support frame, and a retracting lens frame. The frame body has a restrictor. The support frame has a restricted portion. The movement of the support frame in the optical axis direction is restricted with respect to the frame body when the restricted portion is restricted by the restrictor, but the support frame still moves within a plane that is perpendicular to the optical axis with respect to the frame body. The retracting lens frame is supported by the support frame, and moves around a retraction shaft substantially perpendicular to the optical axis during a transition period between an imaging enabled state and a housed state. The retracting lens frame has a pressing portion that is pressed during the transition period between the imaging enabled state and the housed state. The support frame has a frame body contact portion that comes into contact with the frame body when the pressing portion is pressed. The frame body has a support frame contact portion that comes into contact with the frame body contact portion. When the pressing portion is pressed, the frame body contact portion and the support frame contact portion come into contact with each other, which reduces the load exerted on the restrictor and the restricted portion.

The technology disclosed herein provides a lens barrel with which stable OIS operation is possible.

The configuration and effect discussed above will now be described in specific terms.

(4-1) This lens barrel 20 comprises a shutter unit 250, the OIS frame 400, and the retracting lens frame 401. The shutter unit 250 has a restrictor 420. The OIS frame 400 has a restricted portion 510. When the restricted portion 510 is restricted by the restrictor 420, movement of the OIS frame 400 in the optical axis direction is restricted with respect to the shutter unit 250, but the OIS frame 400 is configured to move within a plane that is perpendicular to the optical axis with respect to the shutter unit 250. The retracting lens frame 401 is supported by the OIS frame 400, and moves around a retraction shaft that is substantially parallel to the optical axis during the transition period between the imaging enabled state and the housed state.

The retracting lens frame 401 has a pressing portion 605 that is pressed during the transition period between the imaging enabled state and the housed state. The OIS frame 400 has a first stress diffuser 511 (frame body contact portion) that comes into contact with the shutter unit 250 when the pressing portion 605 is pressed. The shutter unit 250 has a second stress diffuser 422 (support frame contact portion) that comes into contact with the first stress diffuser 511. When the pressing portion 605 is pressed, the first stress diffuser 511 and the second stress diffuser 422 come into contact with each other, which reduces the load exerted on the restrictor 420 and the restricted portion 510.

With this lens barrel 20, the first stress diffuser 511 (frame body contact portion) formed on the OIS frame 400, and the second stress diffuser 422 formed on the shutter unit 250 are configured to come into contact with each other. Specifically, even if a very stiff rotary spring 403 is used to mount the retracting lens frame 401 to the OIS frame 400, the pressing force generated when the retracting lens frame 401 is rotated, is diffused into a force transmitted from the restricted portion 510 of the OIS frame 400 to the restrictor 420 of the shutter unit 250, and a force that is transmitted from the first stress diffuser 511 to the second stress diffuser 422. Consequently, less load is exerted on the restrictor 420 of the shutter unit 250 and on the restricted portion 510 of the OIS frame 400. Specifically, the optical axis direction component of the pressing force can be prevented from causing deformation or damage to the restrictor 420 of the shutter unit 250 and to the restricted portion 510 of the OIS frame 400. This allows the OIS to operate stably.

(4-2) With this lens barrel 20, the first stress diffuser 511 is provided to the OIS frame 400 at a position closer to the pressing portion 605 than the restricted portion 510.

With this lens barrel 20, the first stress diffuser 511 is provided to the OIS frame 400 at a position that is closer to the pressing portion 605 than the restricted portion 510. Accordingly, when the first stress diffuser 511 comes into contact with the second stress diffuser 422, the force transmitted from the first stress diffuser 511 to the second stress diffuser 422 becomes greater than the force transmitted from the restricted portion 510 to the restrictor 420. Specifically, the force exerted on the restrictor 420 and the restricted portion 510 can be reduced.

(4-3) With this lens barrel 20, when the pressing portion 605 of the retracting lens frame 401 is pressed, the contact portions 603 of the retracting lens frame 401 come into contact with the OIS frame 400. The first stress diffuser 511 of the OIS frame 400 then comes into contact with the second stress diffuser 422 of the shutter unit 250. This reduces the force exerted on the restrictor 420 and the restricted portion 510.

Other Embodiments (A) In the above embodiment, the lens barrel 20 comprised the third rectilinear frame 130, but the third rectilinear frame 130 may be omitted.

(B) In the above embodiment, the second rectilinear frame 120 was disposed on the inside of the first rotary frame 210, but this is not the only option. The second rectilinear frame 120 may be disposed on the outside of the first rotary frame 210. That is, the second rectilinear frame 120 should be disposed on the inside of the first rectilinear frame 110.

(C) In the above embodiment, the lens barrel 20 comprised the first to fifth lens groups L1 to L5, but this is not the only option. The lens barrel 20 should at least comprise the first lens group L1.

(D) In the above embodiment, the lens barrel 20 comprised a three-stage telescoping zoom mechanism, but this is not the only option. The lens barrel 20 may have a telescoping mechanism of more than three stages.

(E) In the above embodiment, the cam grooves b were formed in one of two frames, and the cam protrusions B were formed in the other frame, but this is not the only option. The cam protrusions B may be formed in one of the two frames, and the cam grooves b formed in the other frame. Or, the cam grooves b and the cam protrusions B may be formed in each of the two frames.

(F) In the above embodiment, the rectilinear grooves "a" were formed in one of two frames, and the rectilinear protrusions A were formed in the other frame, but this is not the only option. The rectilinear protrusions A may be formed in one of two frames, and the rectilinear grooves a in the other frame. Or, the rectilinear grooves "a" and the rectilinear protrusions A may be formed in each of the two frames.

(G) In the above embodiment, the bayonet grooves e were formed in one of two frames, and the bayonet protrusions E were formed in the other frame, but this is not the only option. The bayonet protrusions E may be formed in one of two frames, and the bayonet grooves e in the other frame. Or, the bayonet grooves e and the bayonet protrusions E may be formed in each of the two frames.

(H) In the above embodiment, the third lens group L3 was retracted to the outside in the radial direction of the fourth and fifth lens groups L4 and L5, but this is not the only option. The third lens group L3 may be disposed ahead of the fourth and fifth lens groups L4 and L5 in the retracted state.

(I) In the above embodiment, an example was given in which the retraction shaft 501 (retraction shaft 501b) was provided to the OIS frame 400 and the shaft support 601 was provided to the retracting lens frame 401, but the shaft support 601 may be provided to the OIS frame 400, and the retraction shaft 501 (retraction shaft 501b) to the retracting lens frame 401.

Figure 23:
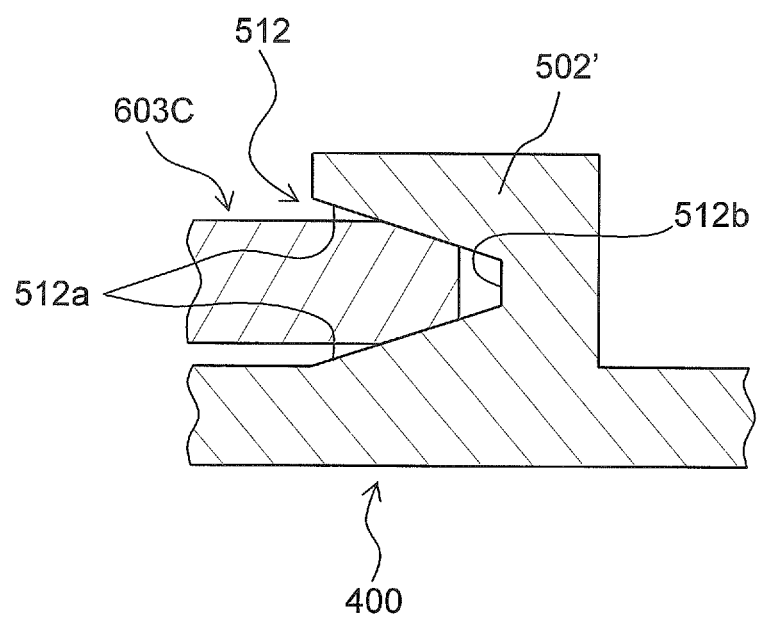
FIG. 23 is a detail cross section pertaining to another embodiment, of a state in which a retracting lens frame has been engaged with the anti-rotation portion of an OIS frame.

(J) In the above embodiment, as shown in FIG. 12, an example was given in which the anti-rotation portion 502 of the OIS frame 400 had a concave shape, and the third contact portion 603C of the retracting lens frame 401 came into contact with the sloped face 502a of the anti-rotation portion 502. Instead, as shown in FIG. 23, the third contact portion 603C of the retracting lens frame 401 may come into contact with two side faces 512a in a concave portion 512 of an anti-rotation portion 502'. In this case, the two side faces 512a of the concave portion 512 are inclined and opposite each other. More specifically, the two side faces 512a of the concave portion 512 are formed so as to move closer to together toward the bottom 512b of the concave portion 512. This allows the retracting lens frame 401 to be positioned more reliably with respect to the OIS frame 400.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein can be widely applied to lens barrels.

What is claimed is:
1. A lens barrel, comprising:
a support frame; and
a retracting lens frame configured to support a lens and move around a retraction shaft with respect to the support frame during a transition period between an imaging enabled state and a housed state, the retraction shaft being substantially parallel to an optical axis of the lens, wherein:
the retracting lens frame includes at least three contact portions, the at least three contact portions configured to come into contact with the support frame at positions that are different from the retraction shaft;
movement of the retracting lens frame in the optical axis direction is restricted when the contact portions come into contact with the support frame; and
at least one of the contact portions is provided to the retracting lens frame so as to overlap the lens in a direction perpendicular to the optical axis.
2. The lens barrel according to claim 1, further comprising:
a first biasing means fixed to the support frame and configured to bias the retracting lens frame with respect to the support frame, wherein
the first biasing means allows at least two of the contact portions to come into contact with the support frame.
3. The lens barrel according to claim 2, further comprising
a second biasing means fixed to the support frame and configured to bias the retracting lens frame around the retraction shaft, wherein:
the support frame includes an anti-rotation portion, the anti-rotation portion configured to restrict movement of the retracting lens frame biased by the second biasing means;
the anti-rotation portion includes a sloped face, the sloped face configured to slope with respect to the optical axis; and
if the retracting lens frame has been biased by the second biasing means, the retracting lens frame is guided toward the support frame when one of the at least three contact portions comes into contact with the sloped face.

4. The lens barrel according to claim 1, wherein
at least one of the contact portions is provided to the retracting lens frame so as to overlap the lens within a thickness range of the lens in a direction perpendicular to the optical axis.

5. The lens barrel according to claim 1, wherein:
the at least three contact portions are four contact portions; and
at least three of the four contact portions are configured to come into contact with the support frame.

6. The lens barrel according to claim 1, wherein:
the at least three contact portions are three contact portions, and
two of the at least three contact portions are disposed on both sides of a straight line linking the retraction shaft and the optical axis of the lens.

7. The lens barrel according to claim 1, wherein
at least one of the contact portions is provided to the retracting lens frame so that an angle becomes an obtuse angle, the angle formed by a first line segment and a second line segment, the first line segment linking at least one of the contact portions and the optical axis of the lens, the second line segment linking the retraction shaft and the optical axis of the lens.

8. The lens barrel according to claim 7, further comprising:
a first biasing means fixed to the support frame and configured to bias the retracting lens frame with respect to the support frame, wherein
the first biasing means allows at least two of the contact portions to come into contact with the support frame.

9. The lens barrel according to claim 8, further comprising
a second biasing means fixed to the support frame and configured to bias the retracting lens frame around the retraction shaft, wherein:
the support frame includes an anti-rotation portion, the anti-rotation portion configured to restrict movement of the retracting lens frame biased by the second biasing means;
the anti-rotation portion includes a sloped face, the sloped face configured to slope with respect to the optical axis; and
if the retracting lens frame has been biased by the second biasing means, the retracting lens frame is guided toward the support frame when one of the at least three contact portions comes into contact with the sloped face.

10. The lens barrel according to claim 7, wherein:
at least one of the contact portions is provided to the retracting lens frame so that a straight line is disposed between the retraction shaft and at least one of the contact portions, and the straight line passing through the optical axis of the lens and is perpendicular to a straight line linking the optical axis of the lens and the retraction shaft.

11. The lens barrel according to claim 1, wherein:
the support frame includes at least three rail portions, the at least three rail portions formed at positions opposite to the at least three contact portions during a transition period between the imaging enabled state and the housed state; and
movement of the retracting lens frame in the optical axis direction is restricted when the contact portions come into contact with the rail portions.

12. The lens barrel according to claim 1, further comprising a frame body including a restrictor, wherein:
the support frame includes a restricted portion;
movement of the support frame in the optical axis direction with respect to the frame body is restricted when the restricted portion is restricted by the restrictor;
the support frame is configured to move in a plane perpendicular to the optical axis with respect to the frame body;
the retracting lens frame further includes a pressing portion, the pressing portion configured to be supported by the support frame and configured to be pressed during a transition period between the imaging enabled state and the housed state;
the support frame includes a frame body contact portion, the frame body contact portion configured to come into contact with the frame body when the pressing portion is pressed;
the frame body includes a support frame contact portion, the support frame contact portion configured to come into contact with the frame body contact portion; and
the frame body contact portion and the support frame contact portion come into contact with each other in order to reduce the load exerted on the restrictor and the restricted portion when the pressing portion is pressed.

13. The lens barrel according to claim 12, wherein
the frame body contact portion is provided to the support frame at a position closer to the pressing portion than the restricted portion.

14. The lens barrel according to claim 12, wherein:
when the pressing portion of the retracting lens frame has been pressed, the contact portions of the retracting lens frame are configured to come into contact with the support frame, and the frame body contact portion of the support frame is configured to come into contact with the support frame contact portion of the frame body.

15. A lens barrel, comprising:
a support frame configured to support a retracting lens frame, the retracting lens frame including a retracting lens;
a retraction mechanism configured to move the retracting lens frame between an imaging position and a retracted position with respect to the support frame; and
a frame body including an actuator, the actuator configured to move the support frame in a plane substantially perpendicular to an optical axis of the lens, wherein:
the retracting lens frame includes a contact portion, the contact portion configured to bias in the optical axis direction and come into contact with the support frame;
movement of the retracting lens frame in the optical axis direction is restricted when the contact portion comes into contact with the support frame; and
the contact portion is configured to come into contact with the support frame at a position that overlaps the retracting lens in a direction perpendicular to the optical axis.

* * * * *